United States Patent
Ohishi et al.

(10) Patent No.: US 7,935,239 B2
(45) Date of Patent: May 3, 2011

(54) LIQUID MOVING APPARATUS

(75) Inventors: Tadahiro Ohishi, Gifu (JP); Keita Tanaka, Aichi (JP); Masaki Ando, Chiba (JP); Kazuhiro Tanaka, Tokyo (JP)

(73) Assignee: Sony Corporation (JP)

( * ) Notice: Subject to any disclaimer, the term of this patent is extended or adjusted under 35 U.S.C. 154(b) by 1092 days.

(21) Appl. No.: 11/700,722

(22) Filed: Jan. 31, 2007

(65) Prior Publication Data
US 2007/0246365 A1 Oct. 25, 2007

(30) Foreign Application Priority Data
Feb. 1, 2006 (JP) ................. P2006-024568

(51) Int. Cl.
*B03C 5/02* (2006.01)
*G02B 3/12* (2006.01)
(52) U.S. Cl. ...................... 204/643; 345/665
(58) Field of Classification Search ............. 204/643; 422/81, 189; 359/665–667; 345/49
See application file for complete search history.

(56) References Cited

U.S. PATENT DOCUMENTS
6,369,954 B1 * 4/2002 Berge et al. ............... 359/666
2004/0058450 A1 * 3/2004 Pamula et al. ............. 436/150

FOREIGN PATENT DOCUMENTS
JP 2004-336898 A 11/2004

* cited by examiner

*Primary Examiner* — Ula C Ruddock
*Assistant Examiner* — J. Christopher Ball
(74) *Attorney, Agent, or Firm* — Lerner, David, Littenberg, Krumholz & Mentlik, LLP

(57) ABSTRACT

A liquid moving apparatus is disclosed. The liquid moving apparatus may include a container having a holding chamber enclosed by first and second end walls facing against each other and side walls connecting the first and second end walls, a polarized or conductive first liquid filled in the holding chamber, a second liquid filled in the holding chamber and prevented from mixing with the first liquid, first and second electrodes for applying an electric field to the first liquid, and voltage application means for applying voltage between the first electrode and the second electrode.

9 Claims, 18 Drawing Sheets

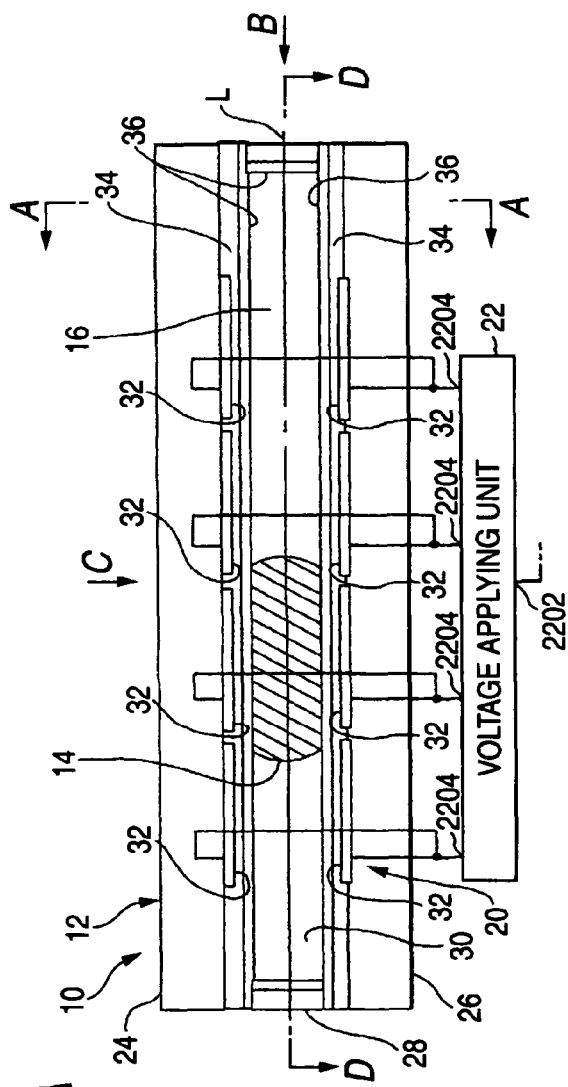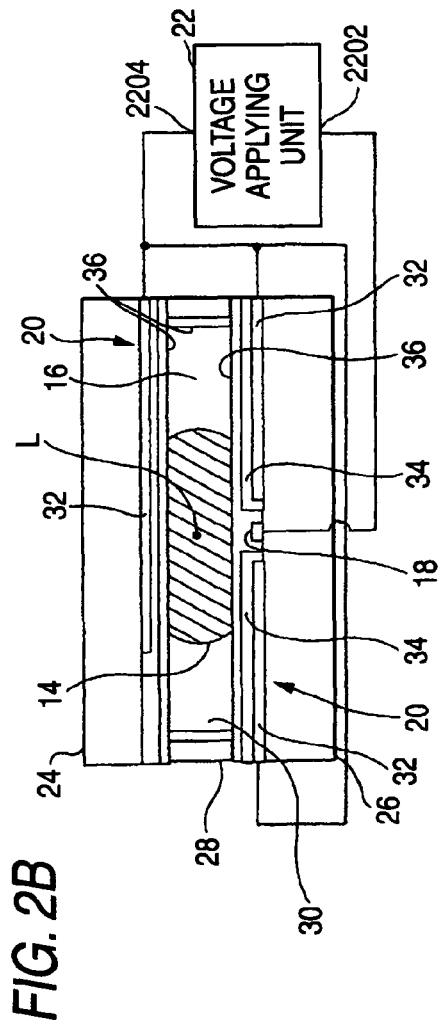
FIG. 2A
FIG. 2B

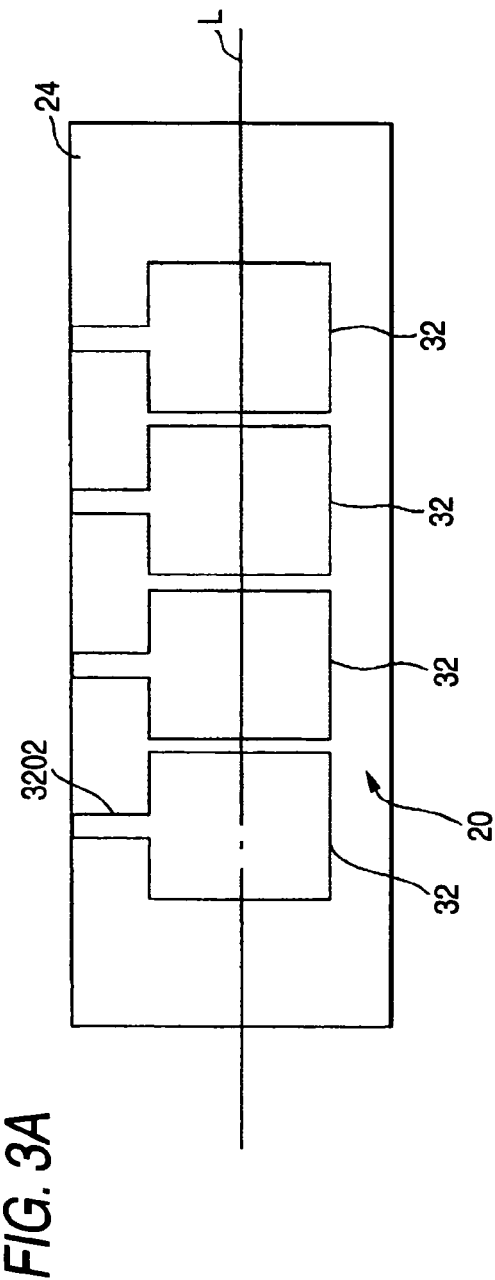
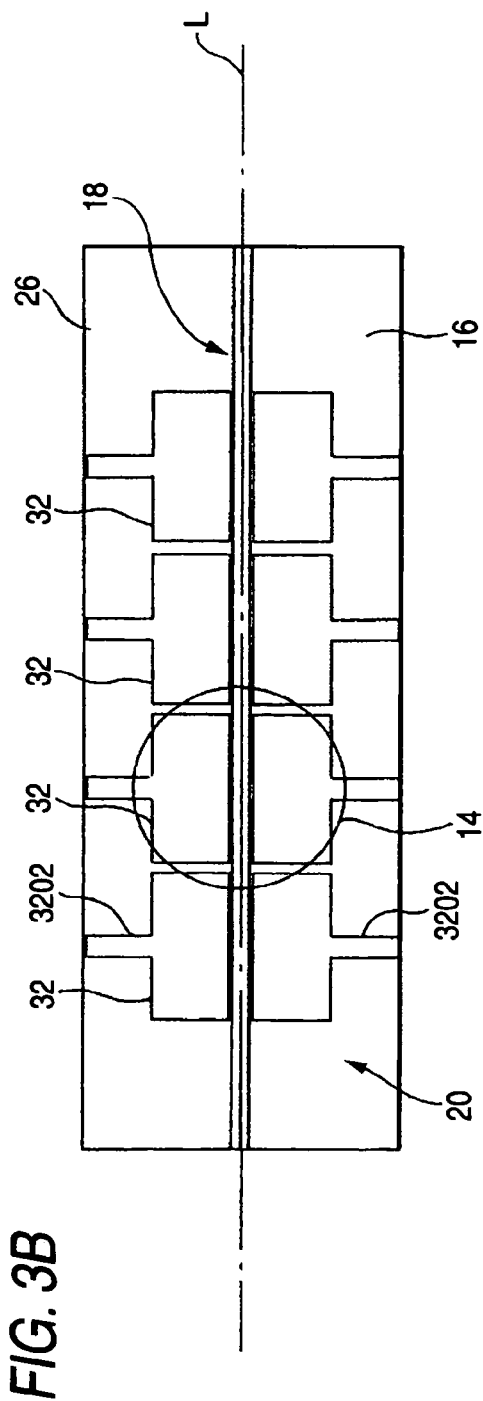
FIG. 3A
FIG. 3B

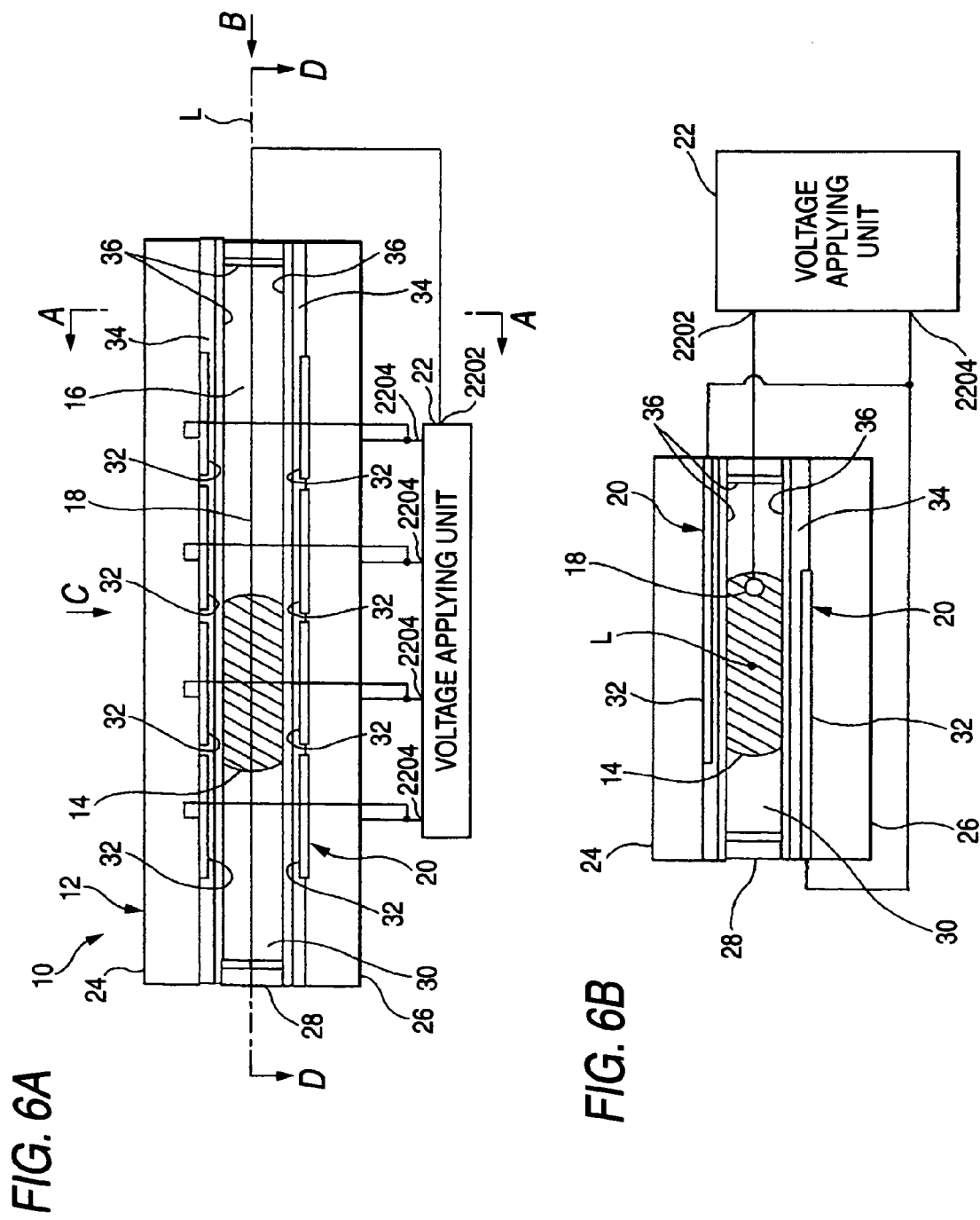

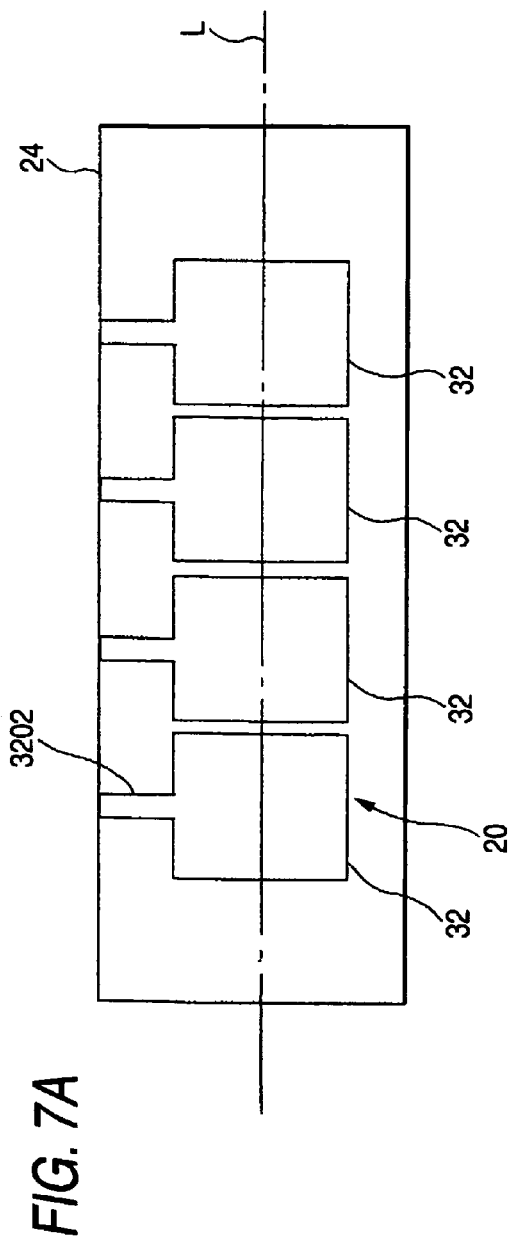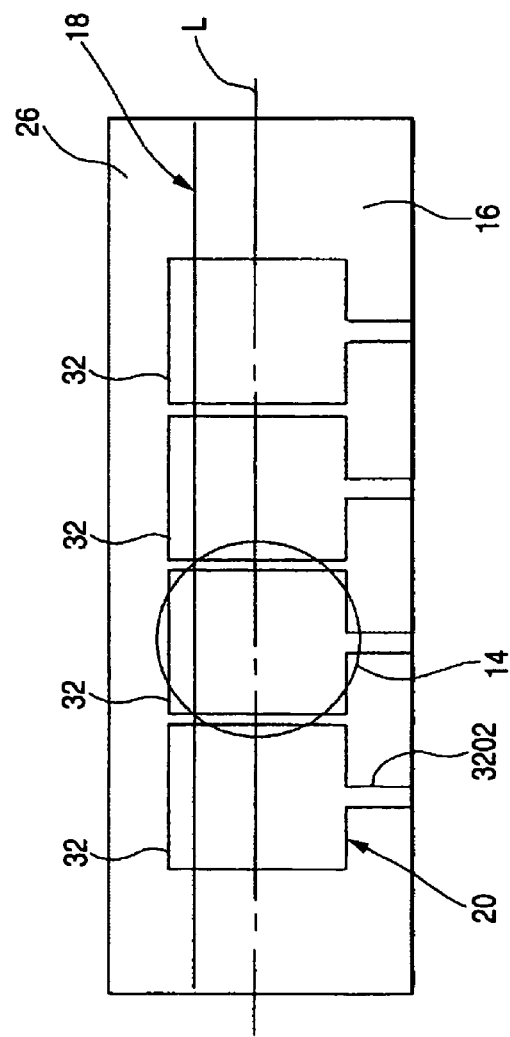
FIG. 7A
FIG. 7B

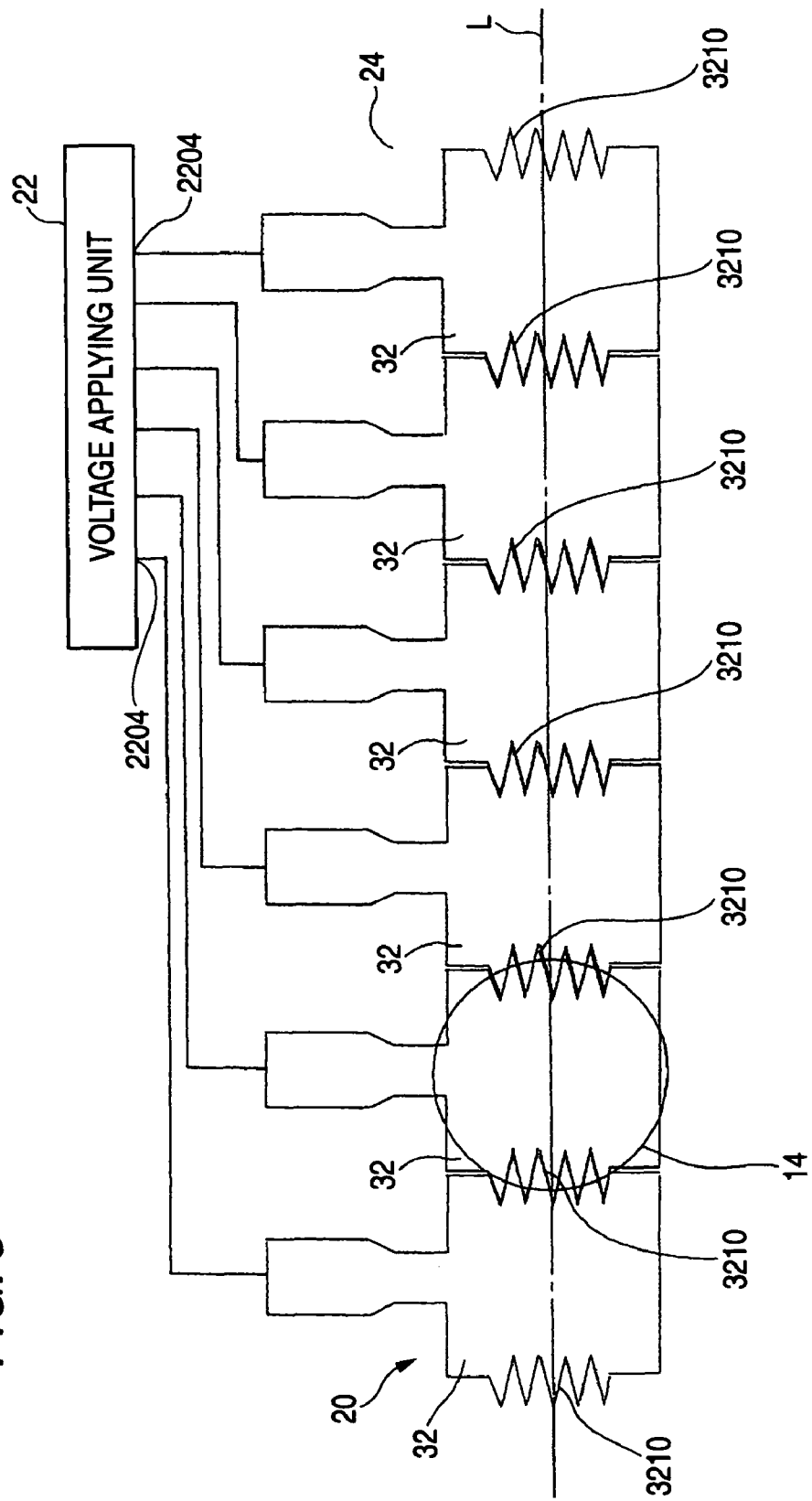

LIQUID MOVING APPARATUS

CROSS-REFERENCE TO RELATED APPLICATIONS

This application claims priority from Japanese Patent Application No. JP2006-024568 filed in the Japanese Patent Office on Feb. 1, 2006, the entire content of which is incorporated herein by reference.

BACKGROUND OF THE INVENTION

1. Field of the Invention

The present invention relates to a liquid moving apparatus.

2. Description of the Related Art

An optical element has been proposed which changes the optical characteristic of a liquid by changing the conductivity or the form of the liquid based on an electric capillary phenomenon (electrowetting phenomenon) through the application of an electric field to the polarized or conductive liquid.

Liquid moving means has been proposed which moves a liquid itself in a desired direction by applying an electric field to a polarized or conductive liquid (refer to JP-A-2004-336898 (Patent Document 1)).

The liquid moving means includes a first electrode in contact with a liquid (or liquid drop), multiple second electrodes provided to a liquid through an insulating layer and aligned in a predetermined direction and control means for controlling each voltage to be applied between the first electrode and each of the second electrodes. In this case, the liquid on the insulating layer is moved in the predetermined direction by changing the position subject to the application of voltage in the second electrodes by the control means.

SUMMARY OF THE INVENTION

An increase in speed of the movement of a liquid is demanded in order to improve the response property of a shutter including the liquid moving means on the optical axis of a shooting optical system of an imaging apparatus, in which the liquid is moved in the direction orthogonal to the optical axis.

However, the technology in the past has a limited increase in strength of the electric field to be applied to a liquid, which also limits the increase in speed of the movement of the liquid.

Accordingly, it is desirable to propose a liquid moving apparatus, which is advantageous for increasing the speed of movement of a liquid.

According to an embodiment of the present invention, there is provided a liquid moving apparatus which may include a container having a holding chamber enclosed by first and second end walls facing against each other and side walls connecting the first and second end walls, a polarized or conductive first liquid filled in the holding chamber, a second liquid filled in the holding chamber and prevented from mixing with the first liquid, first and second electrodes for applying an electric field to the first liquid, and voltage application means for applying voltage between the first electrode and the second electrode, wherein the first and second electrodes are placed along a virtual axis extending in the direction where the first and second end walls face against each other, which is the direction orthogonal to the direction of the thickness of the container, the change of the position subject to the voltage application by the voltage application means to the direction of the extension of the first and second electrodes brings the first liquid contact with both of the first and second end walls and moves the entire first liquid surrounded by the second liquid along the virtual axis, and the second electrode is provided on the internal surface of the first end wall and the internal surface of the second end wall, which face the holding chamber, and includes multiple second electrode bodies in the direction of the extension of the virtual axis.

In the liquid moving apparatus according to the embodiment of the invention, a first liquid may face both of the two second electrode bodies on the first and second end walls. Thus, the electric field generated by the voltage applied between the first electrode and the second electrode can be applied to a wider area of the first liquid. Therefore, a larger force can be applied to the first liquid, which is advantageous for an increase in speed of the movement of the first liquid.

BRIEF DESCRIPTION OF THE DRAWINGS

FIG. 2A is a longitudinal section diagram showing a construction of a liquid moving apparatus 10, and FIG. 2B is a section diagram taken by the line A-A in FIG. 2A;

FIG. 3A is a view on the arrow C, and FIG. 3B is a section diagram taken by the line D-D in FIG. 2A;

FIG. 6A is a longitudinal section diagram showing a construction of the liquid moving apparatus 10 according to a second embodiment, and FIG. 6B is a section diagram taken by the line A-A in FIG. 6A;

FIG. 7A is a view on the arrow C in FIG. 6A, and FIG. 7B is a section diagram taken by the line D-D in FIG. 6A;

FIG. 8 is a plan view showing a form of a second electrode 20 on the internal surface of a first end wall 24 of the liquid moving apparatus 10 according to a third embodiment;

DETAILED DESCRIPTION

The operational principle of liquid movement by an electric field will be first described.

Figure 1A:
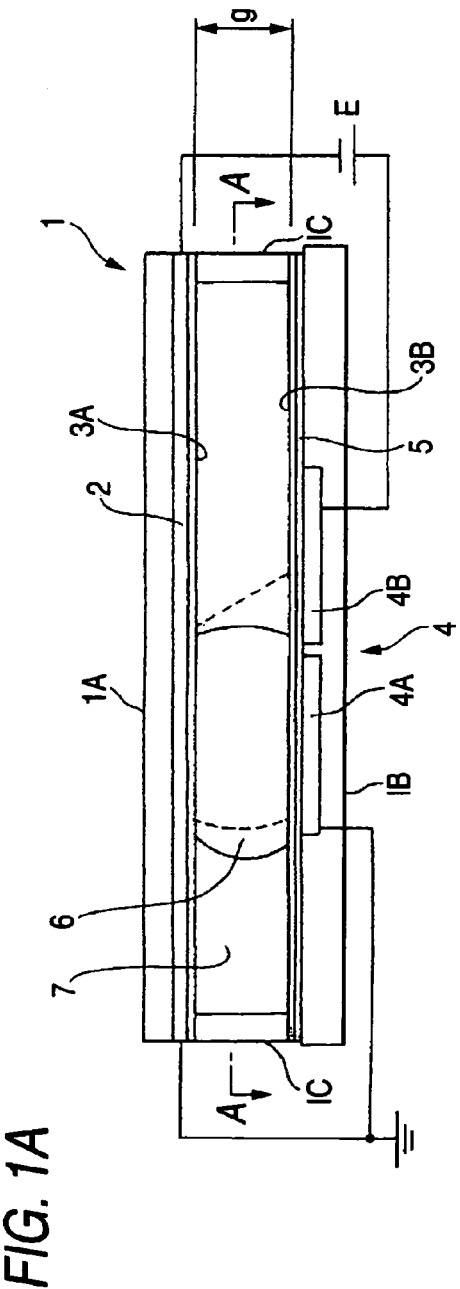
FIG. 1A is a section diagram describing the principle of movement of a liquid.
Figure 1B:
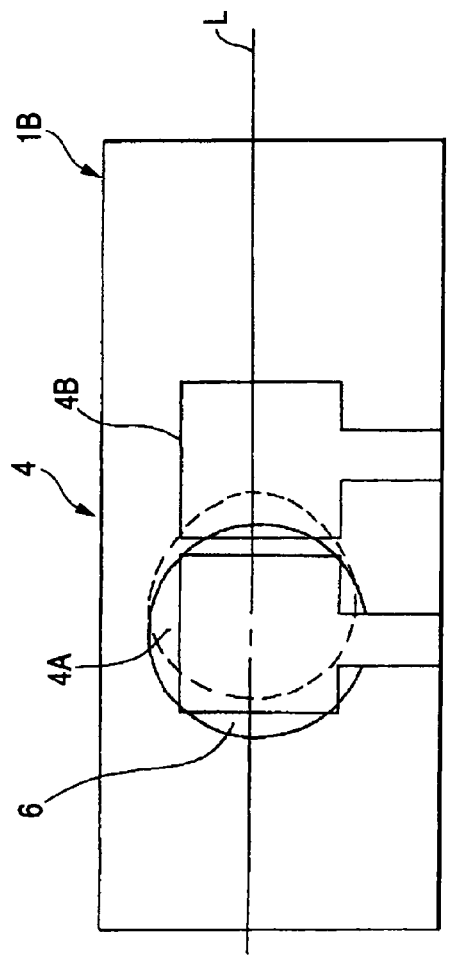
FIG. 1B is a section diagram taken by the line A-A in FIG. 1A.

FIG. 1A is a section diagram describing the principle of liquid movement, and FIG. 1B is a section diagram taken by the line A-A in FIG. 1A.

As shown in FIGS. 1A and 1B, a holding chamber 1 is tightly enclosed by first and second end walls 1A and 1B facing against each other and having a space g therebetween and side walls 1C connecting the first and second end walls 1A and 1B.

A first electrode 2 is provided on the entire inner surface of the first end wall 1A, and the surface where the first electrode 2 faces against the holding chamber 1 is covered by a water-repellent film 3A.

A second electrode 4 is provided on the inner surface of the second end wall 1B, and the second electrode 4 includes two electrode bodies 4A and 4B aligned along a virtual axis L extending in the direction orthogonal to the direction in which the first and second end walls 1A and 1B face against each other.

The entire areas of the surfaces of the two electrode bodies 4A and 4B and the inner surface of the second end wall 1B are covered by an insulating film 5, and the entire area of the surface of the insulating film 5 facing the holding chamber 1 is covered by a water-repellent film 3B.

A polarized and conductive first liquid 6 is positioned on the surface of the insulating film 5. The first electrode 2 faces the first liquid 6 through the water-repellent film 3A, and the second electrode 4 faces the first liquid 6 through the insulating film 5 and water-repellent film 3B.

The holding chamber 1 is filled with the second liquid 7 around the first liquid 6. The second liquid 7 does not mix with the first liquid.

The first electrode 2 and the two electrode bodies 4A and 4B of the second electrode 4 are initially grounded, and the first liquid 6 at that state is positioned across the entire area of the one electrode body 4A and the part of the other electrode body 4B which close to the electrode body 4A.

At this state, the first liquid 6 has a round form at the plane vision as indicated by the solid line in the FIGS. 1A and 1B due to the surface tension.

When a voltage E is applied to the other electrode body 4B here, the position where the insulating film 5 faces the first liquid 6 is positively charged. Thus, an electric field (electrostatic force) is applied to the position where the first liquid 6 faces the insulating film 5, and negative charges, that is, the molecule of the first liquid 6 are pulled to the position where the first liquid 6 faces the insulating film 5.

Then, the first liquid 6 changes the form and is pulled toward the electrode body 4B as indicated by the broken line in FIGS. 1A and 1B. In the end, all of the first liquid 6 surrounded by the second liquid 7 moves from the above of the one electrode body 4A to the above of the other electrode body 4B in the direction of the extension of a virtual axis L.

The water-repellent films 3A and 3B act for reducing the resistance which is caused between the liquid 6 and the first and second end walls 1A and 1B when the first liquid 6 moves on the first and second electrodes 2 and 4, such that the first liquid 6 can move easily.

In this way, the first liquid 6 is moved by applying an electric field to the polarized or conductive first liquid 6 by the first and second electrodes 2 and 4.

First Embodiment

Next, a liquid moving apparatus 10 of this embodiment will be described.

According to this embodiment, the liquid moving apparatus 10 functions as a shutter.

FIG. 2A is a longitudinal section diagram showing a construction of the liquid moving apparatus 10, and FIG. 2B is a section diagram taken by the line A-A.

FIG. 3A is a vision on the arrow C in FIG. 2A, and FIG. 3B is a section diagram taken by the line D-D in FIG. 2A.

As shown in FIGS. 2A and 2B, the liquid moving apparatus 10 includes a container 12, a first liquid 14, a second liquid 16, a first electrode 18, a second electrode 20 and a voltage application section 22.

The container 12 has first and second end walls 24 and 26 facing and extending against each other in parallel, side walls 28 connecting the first and second end walls 24 and 26 and a holding chamber 30 tightly enclosed by the first and second end walls 24 and 26 and the side walls 28.

The expression, "the direction of thickness of the container 12", refers to the direction in which the first end wall 24 and the second end wall 26 face against.

According to this embodiment, the first and second end walls 24 and 26 have the same rectangular plate form in a same size. The side walls 28 have a rectangular frame form along the edges of the first and second end walls 24 and 26. The section of the holding chamber 30 has a rectangular flat column form.

The first and second end walls 24 and 26 and the side walls 28 contain an insulating material, and the first and second end walls 24 and 26 contain a clear material allowing light to pass through.

The first and second end walls 24 and 26 may contain a clear and insulating synthetic resin material or a clear glass material.

The first liquid 14 is polarized or conductive and is filled in the holding chamber 30.

The second liquid 16 does not mix with the first liquid 14 and is filled in the holding chamber 30.

The first liquid 14 and the second liquid 16 have a substantially equal specific gravity, and the transmittance of the first liquid 14 is lower than the transmittance of the second liquid 16.

According to this embodiment, the first liquid 14 is formed by mixing particles containing a material that does not allow light to pass through into a liquid containing a mix of pure water, ethanol and ethylene glycol.

The particles may be carbon black. If carbon black is used therefor, hydrophilic coating processing on the surface of the carbon black such that the carbon black can be uniformly mixed into the first liquid 14. The hydrophilic coating processing may be performed by forming a hydrophilic group on the surface of the carbon black, for example.

According to this embodiment, the second liquid 16 contains a clear silicon oil.

The use of one with a low viscosity as the silicon oil contained in the second liquid 16 can reduce the viscous drag between the first and second liquids 14 and 16 and alleviates the friction between the first liquid 14 and the first and second end walls 24 and 26, which is advantageous for the improvement in response properties by an increase in moving speed of the first liquid 14.

The liquid which can be used as the first liquid 14 is not limited to the one in this embodiment but may be nitromethane, acetic anhydride, methyl acetate, ethyl acetate, methanol, acetonitrile, acetone, ethanol, propionitrile, tetrohydrofuran, n-hexane, 2-propanol, 2-butanone, n-butyronitrile, 1-propanol, 1-butanol, dimethyl sulfoxide, chlorobenzene, ethylene glycole, formamide, nitrobenzene, propylene carbonate, 1,2-dichloroethane, carbonate disulfide, chloroform, bromobenzene, carbon tetrachloride, trichloroacetic acid anhydride, toluene, benzene, ethylenediamine, N,N-dimethylacetamide, N,N-dimethylformamide, tributyl phosphate, pyridine, benzonitrile, aniline, 1,4-dioxane or hexamethylphosphoramide, for example.

The liquid applicable as the second liquid 16 may be silicon, decane base, octane base, nonane or heptane, for example.

Each of the first liquid 14 and the second liquid 16 may be a single liquid or a mix of multiple liquids. In other words, the first liquid 14 and the second liquid 16 may be only required to have a substantially equal specific gravity.

The first and second electrodes 18 and 20 are used for applying an electric field to the first liquid 14.

The first and second electrodes 18 and 20 are placed along the virtual axis L extending in the direction orthogonal to the direction of the thickness of the container 12, which is in the direction where the first and second end walls 24 and 26 face against each other. According to this embodiment, the direction where the virtual axis L extends is parallel to the direction of the long side of the container 12.

As shown in FIGS. 2B and 3B, according to this embodiment, the first electrode 18 extends linearly (straight) along the virtual axis L on the second end wall 26 (on the internal surface where the second end wall 26 faces the holding chamber 30).

The first electrode 18 is placed on the center line in the direction of the width orthogonal to the virtual axis L of the second end wall 26.

The second electrode 20 is provided on both of the internal surface of the first end wall 24 and internal surface of the second end wall 26, which face the holding chamber 30. As shown in FIG. 2A and FIGS. 3A and 3B, the second electrode 20 includes multiple second electrode bodies 32 in the direction of the extension of the virtual axis L.

As shown in FIG. 3A, according to this embodiment, the second electrode bodies 32 on the internal surface of the first end wall 24 have an equal rectangular form in an equal size and are equally spaced apart along the virtual axis L.

As shown in FIG. 3B, the second electrode bodies 32 on the internal surface of the second end wall 26 have an equal rectangular form in an equal size and are separated on the both sides in the direction of the width through the first electrode 18.

As shown in FIG. 2A, the second electrode bodies 32 on the first end wall 24 and the second electrode bodies 32 on the second end wall 26, which face against each other, are positioned to fit each other at the edges at the sight in the direction of the thickness of the container 12.

In FIGS. 3A and 3B, the reference numeral 3203 indicates a wiring section extending from the second electrode bodies 32.

The first and second electrodes 18 and 20 may contain a conductive material such as an ITO film (Indium Tin Oxide film) that allows light to pass through, for example.

As shown in FIGS. 2A and 2B, the voltage application section 22 is provided outside of the container 12 and includes a ground terminal 2202 electrically connecting to the first electrode 18 and multiple voltage output terminals 2204 electrically connecting to the second electrode bodies 32 through the wiring section 3202.

The voltage application section 22 is configured to be capable of applying a voltage E selectively to each of the second electrode bodies 32 through the voltage output terminals 2204 and changing the position subject to the voltage application to the direction of the extension of the first and second electrodes 18 and 20.

As shown in FIGS. 2A and 2B, an insulating film 34 is provided on the internal surface of the first end wall 24 facing the holding chamber 30 and the second electrode bodies 32 on the internal surface.

The insulating film 34 is provided only on the second electrode bodies 32 on the internal surface of the second end wall 26 facing the holding chamber 30.

Thus, voltage is applied between the first electrode 18 and the second electrode bodies 32 of the second electrode 20, whereby the surface of the insulating film 34 may be positively charged, for example. Hence, an electric field is applied to the first liquid 14, and the electric field (electrostatic force) acts on the molecule of the first liquid 14. As a result, the first liquid 14 moves.

According to this embodiment, a clear water-repellent film 36 that allows light to pass through covers the entire area of the insulating film 34 on the internal surface of the first end wall 24.

A clear water-repellent film 36 that allows light to pass through covers the entire area of the insulating film 34 on the internal surface of the second end wall 26 and the entire area of the first electrode 18.

A water-repellent film 36 covers the internal surfaces of the side walls 28.

The water-repellent film 36 is configured such that the wettability against the second liquid 16 can be higher than the wettability against the first liquid 14. In other words, the angle of contact of the second liquid 16 against the water-repellent film 36 is configured so as to be lower than the angle of contact of the first liquid 14 against the water-repellent film 36.

The water-repellent film 36 reduces the resistance caused between the first liquid 14 and the first and second end walls 24 and 26 when the first liquid 14 moves on the first and second electrodes 18 and 20 so that the first liquid 14 can move easily.

The water-repellent film 36 is a lipophilic film and may be formed by burning a material mainly containing silicon or by forming a film of a material containing amorphous fluoroplastics. Various publicly known materials in the past may be adopted as the water-repellent film 36.

Next, an operation of the liquid moving apparatus 10 will be described.

Figure 4A:
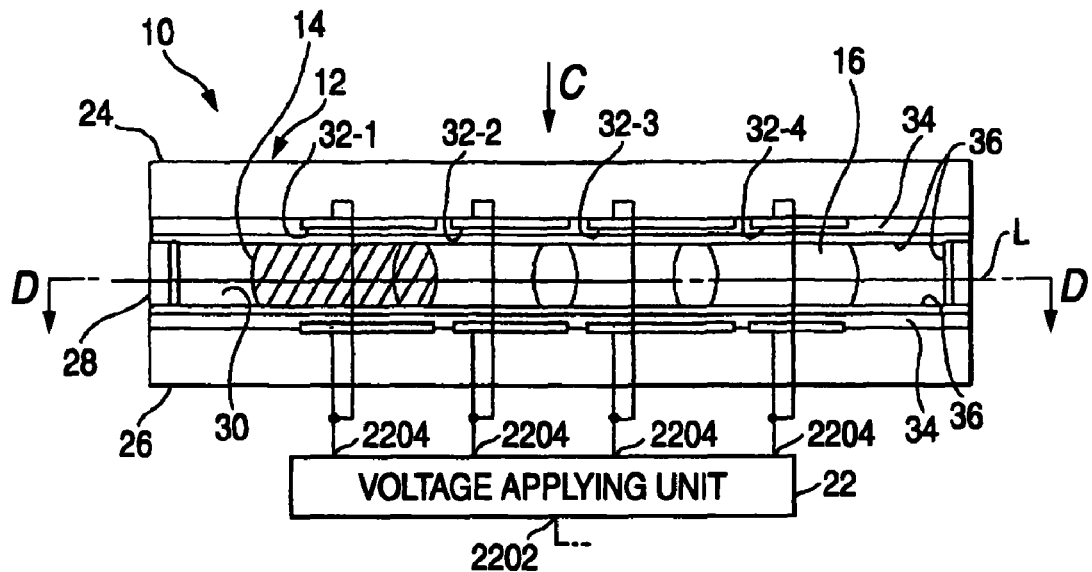
FIG. 4A is a section diagram of the liquid moving apparatus 10.
Figure 4B:
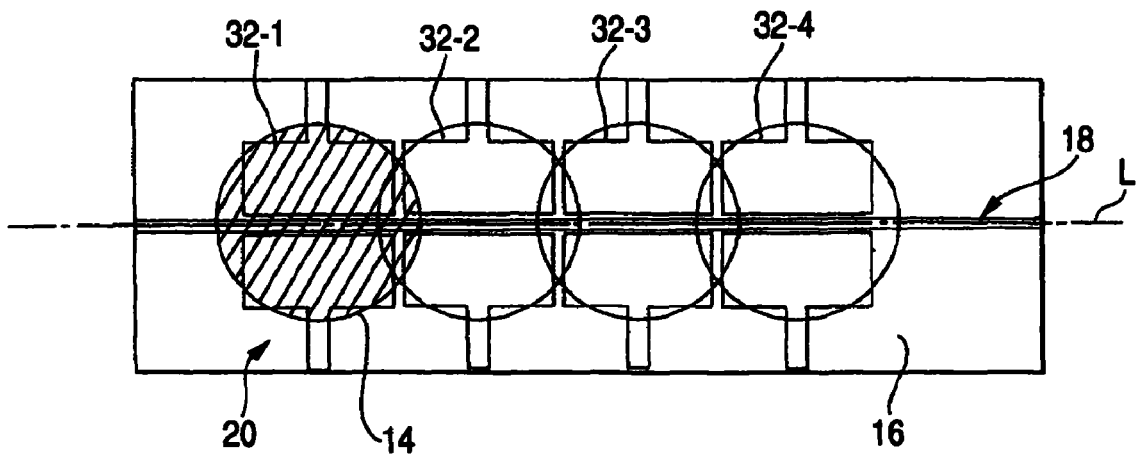
FIG. 4B is a section diagram taken by the line D-D.

FIG. 4A is a section diagram of the liquid moving apparatus 10, and FIG. 4B is a section diagram taken on the line D-D in FIG. 4A.

For convenience of description, reference numerals 32-1, 32-2, 32-3 and 32-4 are given to the second electrode bodies 32 in order from one side to the other side in the direction of the extension of the virtual axis L.

It is assumed that the first liquid 14 is initially positioned at a position between two second electrode bodies 32-1 of the first and second end walls 24 and 26 close to one side of the virtual axis L in the direction of extension.

Under this state, the voltage application section 22 applies the voltage E to the second electrode body 32-1 closest to the virtual axis L in the direction of the extension and applies the ground potential to the remaining second electrode bodies 32-2 to 32-4.

Then, the electric field by the voltage E applied to the first electrode 18 and second electrode body 32-1 acts on the first liquid 14 facing the second electrode body 32-1, whereby the first liquid 14 does not move and can be held at the position. As a result, a most part of the first liquid 14 faces the second electrode body 32-1, and a part of the first liquid faces the adjacent electrode body 32-2.

Next, when the voltage application section 22 applies the voltage E to the second electrode body 32-2 adjacent to the second electrode body 32-1 and applies the ground potential to the remaining second electrode bodies 32-1, 32-3 and 32-4, that is, when the position subjected to the voltage application is changed to the direction of the extension of the first and second electrodes 18 and 20, the electric field by the voltage E applied to the first electrode 18 and the second electrode body 32-2 acts on the first liquid 14 locating at the position facing the second electrode body 32-2. Thus, the entire first liquid 14 surrounded by the second liquid 16 moves toward the other of the virtual axis L in the direction of the extension. As a result, a most part of the first liquid 14 faces the second electrode body 32-2, and a part of the first liquid faces the adjacent second electrode bodies 32-1 and 32-3.

Next, the voltage application section 22 applies the voltage E to the second electrode body 32-3 adjacent to the second electrode body 32-2 and applies the ground potential to the remaining second electrode bodies 32-1, 32-2 and 32-4. That is, the position subject to the voltage application is changed to the direction of the extension of the first and second electrodes 18 and 20. Thus, the electric field caused by the voltage E applied to the first electrode 18 and second electrode body 32-3 acts on the first liquid 14 locating at the position facing the second electrode body 32-3. Therefore, the entire first liquid 14 surrounded by the second liquid 16 moves toward the other of the virtual axis L in the direction of the extension. As a result, a most part of the first liquid 14 faces the second electrode body 32-3, and a part of the first liquid faces the adjacent electrode bodies 32-2 and 32-4.

Next, the voltage application section 22 applies the voltage E to the second electrode body 32-4 adjacent to the second electrode body 32-3 and applies the ground potential to the remaining second electrode bodies 32-1, 32-2 and 32-3. That is, the position subject to the voltage application is changed to the direction of the extension of the first and second electrodes 18 and 20. Thus, the electric field caused by the voltage E applied to the first electrode 18 and second electrode body 32-4 acts on the first liquid 14 locating at the position facing the second electrode body 32-4. Therefore, the entire first liquid 14 surrounded by the second liquid 16 moves toward the other of the virtual axis L in the direction of the extension. As a result, a most part of the first liquid 14 faces the second electrode body 32-4, and a part of the first liquid faces the adjacent electrode body 32-4.

As described above, changing the position subject to the voltage application by the voltage application section 22 in the direction of the extension of the first and second electrodes 18 and 20 moves, along the virtual axis L, the entire first liquid 14 in contact with both of the first and second end walls 24 and 26 and surrounded by the second liquid 16.

In order to reverse the direction of the movement of the first liquid 14, the direction of the change of the position subject to the voltage application by the voltage application section 22 may be reversed.

The liquid moving apparatus 10 is applicable to a shooting optical system of an imaging apparatus such as a digital still camera and a video camera.

Figure 5:
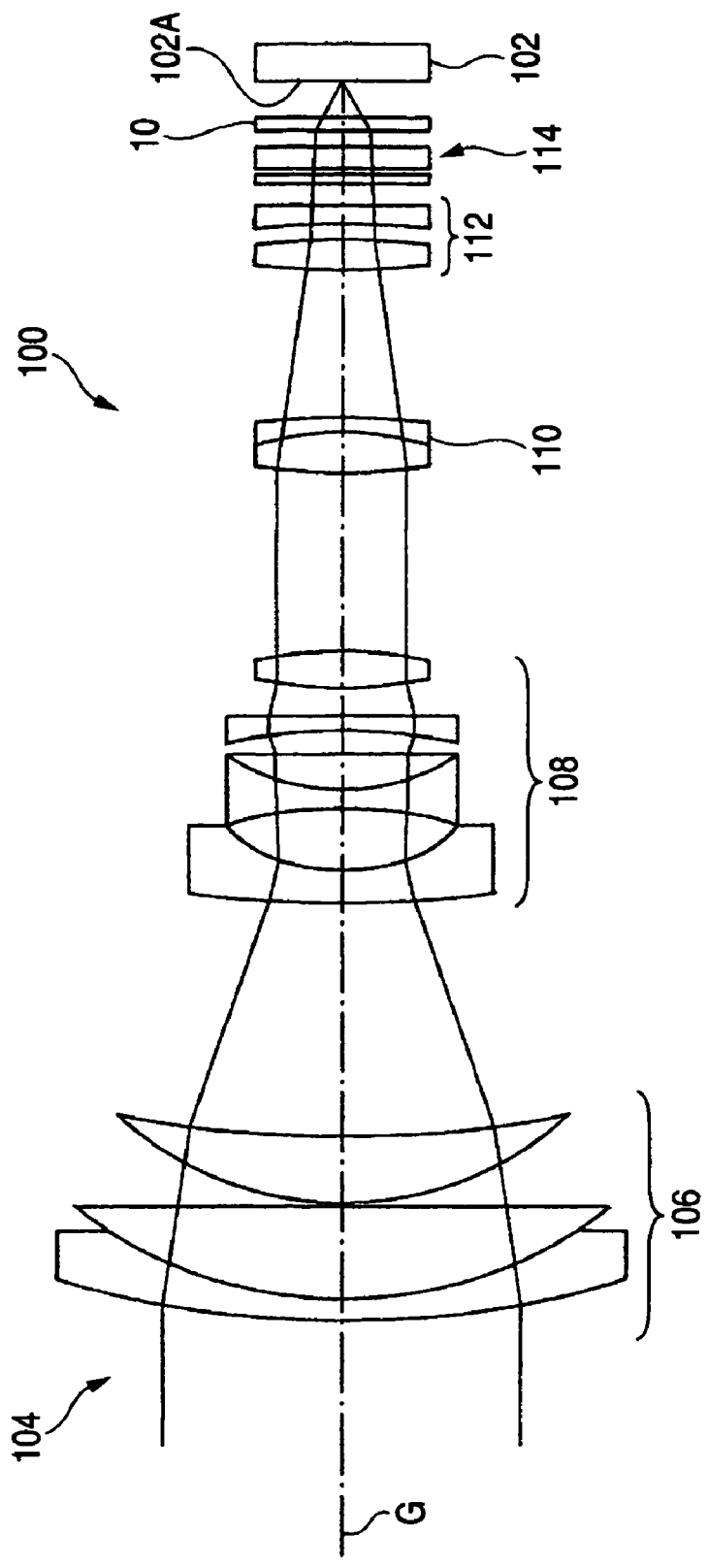
FIG. 5 is a construction diagram showing an example in which the liquid moving apparatus 10 is applied to a shooting optical system of an imaging apparatus.

FIG. 5 is a construction diagram showing an example in which the liquid moving apparatus 10 is applied to a shooting optical system of an imaging apparatus.

As shown in FIG. 5, an imaging apparatus 100 includes an imaging element 102, such as a CCD, that images a subject image and a shooting optical system 104 that conducts the subject image to the imaging element 102.

The shooting optical system 104 has, on the optical axis G, a first lens group 106, a second lens group 108, a third lens group 110, a fourth lens group 112 and a filter group 114 in order from a subject to the shooting element 102.

In this example, the first lens group 106 and third lens group 110 are not movable in the direction of the optical axis, and the second lens group 108 is movable in the direction of the optical axis as a zoom lens. The fourth lens group 112 is movable in the direction of the optical axis as a focus lens.

The light flux from a subject conducted by the first lens group 106 become parallel flux of light by the second lens group 108, are conducted by the third lens group 110 and are converged to an imaging plane 102 of the imaging element 102 through the fourth lens group 112 and filter group 114.

The liquid moving apparatus 10 is placed between the filter group 114 and the imaging element 102, and the first liquid 14 is moved with the virtual axis L in parallel with the plane orthogonal to the optical axis G of the shooting optical system 104. Thus, the first liquid 14 can interrupt the light flux conducted to the imaging element 102.

Therefore, in the liquid moving apparatus 10, when the light flux is interrupted by the movement of the first liquid 14, the time for the irradiation to the imaging plane 102A, that is, the exposure time of the imaging element 102 can be controlled.

The aperture time can be controlled by moving the first liquid 14 in the direction of the extension of the virtual axis L forward and back.

As described above, according to this embodiment, the second electrode 20 is provided on both of the internal surface of the first end wall 24 and the internal surface of the second end wall 26 and includes the multiple second electrode bodies 32 in the direction of the extension of the virtual axis L. The first liquid 14 always faces both of the two second electrode bodies 32 of the first and second end walls 24 and 26. Thus, the electric field generated by the voltage applied between the first electrode 18 and the second electrode 20 can be acted on a wider area of the first liquid 14. Therefore, the force that acts on the first liquid 14 can be increased, which is advantageous for increasing the speed of the movement of the first liquid 14.

In more detail, the force by which the first liquid 14 is drawn to the second electrode 20 when voltage is applied to the second electrode 20 is induced by the gradient of an electric energy (potential).

A liquid moving apparatus in the past only has an insulating film on one of the surfaces in contact with the first liquid 14.

Therefore, the force induced by the electric energy accumulated in the insulating film 34 is ½ of that of the one having insulating films on both of the surfaces in contact of with the first liquid 14 as in an embodiment of the invention.

The force induced to the first liquid 14 by the gradient of the electric energy is expressed by:

$$Fw = \in_0 \in_r V^2 W \perp / t \tag{1}$$

$$Fs = (\tfrac{1}{2}) \in_0 \in_r V^2 W \perp / t = Fw/2 \tag{2}$$

where Equation (1) expresses the force Fw when the second electrode 20 is provided on two surfaces as in this embodiment, and Equation (2) expresses the force Fs when the second electrode 20 is provided only on one surface as in the technology in the past.

In the equations, Fw and Fs are forces [N] that the first liquid 14 receives. V is an applied voltage [V]. $\in_0$ is a dielectric constant $8.85 \times 10^{-12}$ [F/m] under vacuum. $\in_r$ is a specific dielectric constant of the insulating film 34. $W\perp$ is the electrode width [m] that the first liquid 14 occupies on the second electrode body 32 in the direction of width orthogonal to the virtual axis L (the width of the second electrode 20 in the direction perpendicular to the direction of the movement of the first liquid 14). t is the thickness [m] of the insulating film 34.

In other words, according to this embodiment, the force acting on the first liquid 14 is double of that in a liquid moving apparatus in the past, which is advantageous for increasing the speed of the movement of the first liquid 14.

According to this embodiment, the first electrode 18 in a linear form can decrease the size of area of the first electrode 18 (ground electrode) and increases the size of the area of the second electrode 20. Thus, a larger electric energy by the second electrode 20 can be accumulated in the insulating film 34. In other words, the electric field generated by the voltage applied between the first electrode 18 and the second electrode 20 can act on the larger area of the first liquid 14. Therefore, a force can act on the first liquid 14, which is advantageously for increasing the moving speed of the first liquid 14.

Having described that four second electrode bodies 32 are provided along the virtual axis L according to this embodiment, as the number of the second electrode bodies 32 along the virtual axis L increases, the approach distance of the first liquid 14 increases. Since the speed of the movement of the first liquid 14 increases, an increase in number of the second electrode bodies 32 is advantageous for increasing the speed of the movement of the first liquid 14.

When one second electrode is provided as in the technology in the past, the direction of the electric field acting on the first liquid is one. Therefore, when an electric field acts in order to move the first liquid, the form of the first liquid expands along the second electrode. Therefore, the form of the first liquid lacks the stability, which is disadvantageous for securely interrupting the light flux by the first liquid in a shutter.

On the other hand, according to this embodiment, the second electrode bodies 32 of the second electrode 20 are provided on both of the internal surface of the first end wall 24 and the internal surface of the second end wall 26. Thus, electric fields in two directions acts from the two second electrode bodies 32 to the first liquid 14, and the first liquid 14 can be moved with the stability of the form of the first liquid 14 maintained. Therefore, the light flux can be securely interrupted in a shutter, which is advantageous for keeping the optical properties.

Second Embodiment

A second embodiment will be described next.

The second embodiment is a variation example of the first embodiment and is different from the first embodiment in forms of the first electrode 18 and second electrode 20.

FIG. 6A is a longitudinal section diagram showing a construction of the liquid moving apparatus 10 according to the second embodiment. FIG. 6B is a section diagram taken by the line A-A in FIG. 6A. FIG. 7A is a view on the arrow C in FIG. 6A, and FIG. 7B is a section diagram taken by the line D-D in FIG. 6A. In the description of this embodiment, the same reference numerals are given to similar or same components as those in the first embodiment.

As shown in FIGS. 6A and 6B, like the first embodiment, the first electrode 18 and the second electrode 20 are placed along the virtual axis L extending in the direction orthogonal to the direction of the thickness of the container 12 in the direction where the first and second end walls 24 and 26 face against each other. The direction of the extension of the virtual axis L and the direction of the long side of the container 12 are parallel.

The first electrode 18 linearly extends along the virtual axis L and may be a linear conductive member such as a gold wire according to the second embodiment.

According to this embodiment, as shown in FIGS. 6A and 6B, the first electrode 18 extends along the virtual axis L at the position close to the one side of the first end wall 24 in the direction of the width orthogonal to the virtual axis L, as shown in FIG. 7B, in the middle of the container 12 in the direction of the thickness, which is the direction where the first and second end walls 24 and 26 face against each other. The first electrode 18 is spaced apart from the internal surfaces of the first and second end walls 24 and 26 and is spaced apart from the internal surfaces of the two side walls 28 that extend along the virtual axis L.

Notably, if the first electrode 18 is a linear conductive member such as a gold wire, light is interrupted by the first electrode 18. Therefore, the first electrode 18 is placed at a position off the optical path of a shooting optical system.

The second electrode 20 is provided on both of the internal surface of the first end wall 24 and the internal surface of the second end wall 26, which face the holding chamber 30. As shown in FIGS. 6A and 7A and 7B, the second electrode 20 includes multiple second electrode bodies 32 in the direction of the extension of the virtual axis L.

According to the second embodiment, as shown in FIG. 7A, the second electrode bodies 32 on the internal surface of the first end wall 24 have a same rectangular form in a same size and are equally spaced apart along the virtual axis L.

As shown in FIG. 7B, the second electrode bodies 32 on the internal surface of the first end wall 26 have a same rectangular form in a same size and are equally spaced apart along the virtual axis L.

As shown in FIG. 6A, the second electrode bodies 32 on the first end wall 24 and the second electrode bodies 32 on the second end wall 26, which face against each other, fit to each other at the edges at the sight in the direction of the thickness of the container 12.

The first and second electrode 18 and 20 contain a conductive material, which allows light to pass through, like the first embodiment.

The first electrode 18 is connected to the ground terminal 2202 of the voltage application section 22, and the second electrode bodies 32 of the second electrode 20 are connected to the voltage output terminal 2204 of the voltage application section 22 through the wiring section 3202.

Like the first embodiment, the voltage application section 22 is configured to be capable of applying a voltage E selectively to each of the second electrode bodies 32 through the voltage output terminals 2204 and changing the position subject to the voltage application to the direction of the extension of the first and second electrodes 18 and 20.

Like the first embodiment, an insulating film 34 is provided on the internal surface of the first end wall 24 facing the holding chamber 30 and the second electrode bodies 32 on the internal surface.

Thus, voltage is applied between the first electrode 18 and the second electrode bodies 32 of the second electrode 20, whereby the surface of the insulating film 34 may be positively charged, for example. Hence, an electric field is applied to the first liquid 14, and the electric field (electrostatic force) acts on the molecule of the first liquid 14. As a result, the first liquid 14 moves.

A clear water-repellent film 36 that allows light to pass through covers the entire area of the insulating film 34 on the internal surface of the first end wall 24. A clear water-repellent film 36 that allows light to pass through covers the entire area of the insulating film 34 on the internal surface of the second end wall 26.

A water-repellent film 36 covers the internal surfaces of the side walls 28.

Also according to the second embodiment, changing the position subject to the voltage application by the voltage application section 22 in the direction of the extension of the first and second electrodes 18 and 20 moves, along the virtual axis L, the entire first liquid 14 in contact with both of the first and second end walls 24 and 26 and surrounded by the second liquid 16, like the first embodiment.

Therefore, the second embodiment also provides the same effects as those of the first embodiment.

Furthermore, according to the second embodiment, the first electrode 18 is spaced apart from the internal surfaces of the first and second end walls 24 and 26, which is advantageous for providing a larger area of the second electrode bodies 32 than that of the first embodiment. Thus, the electric field generated by the voltage applied between the first electrode 18 and the second electrode 20 can act on a larger area of the first liquid 14. Therefore, a larger force can act on the first liquid 14, which is advantageous for increasing the speed of the movement of the first liquid 14.

Third Embodiment

A third embodiment will be described next.

The third embodiment is a variation example of the first embodiment and is different from the first embodiment in forms of the first electrode 18 and second electrode 20.

Figure 9:
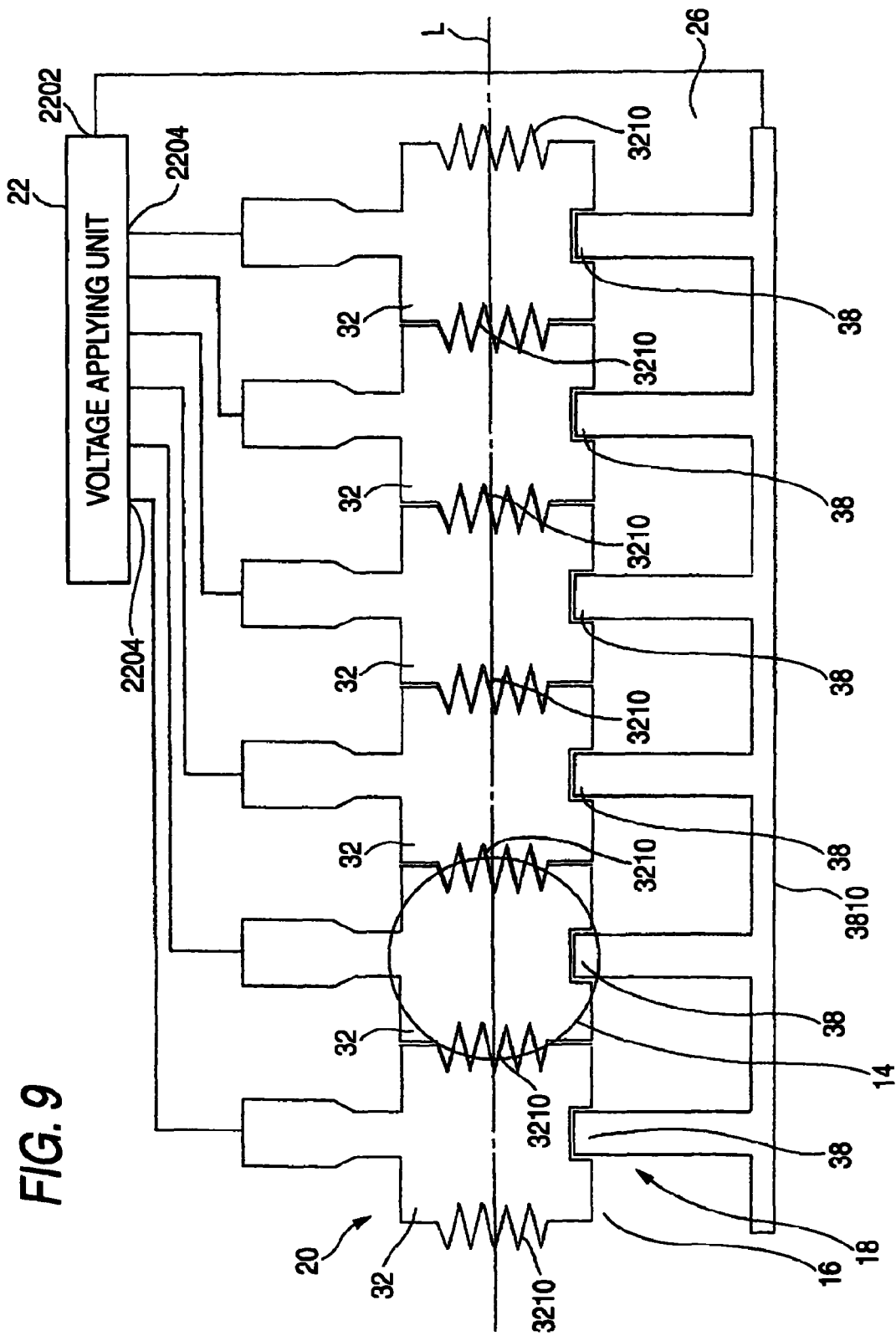
FIG. 9 is a plan view showing forms of the first and second electrodes 18 and 20 on the internal surface of a second end wall 26.

FIG. 8 is a plan view showing a form of the second electrode 20 on the internal surface of the first end wall 24 of the liquid moving apparatus 10 according to the third embodiment. FIG. 9 is a plan view showing forms of the first and second electrodes 18 and 20 on the internal surface of the second end wall 26.

As shown in FIGS. 8 and 9, the second electrode 20 is provided on both of the internal surface of the first end wall 24 and the internal surface of the second end wall 26. The second electrode 20 includes multiple second electrode bodies 32 in the direction of the extension of the virtual axis L.

The second electrode bodies 32 have a same form in a same size and are equally spaced apart along the virtual axis L. Pits and projections 3210 extend at the position where the second electrode bodies 32 are adjacent to each other and in the direction orthogonal to the direction of the extension of the virtual axis L, and the adjacent second electrode bodies 32 are provided with the pits and projections 3210 associating with each other.

The second electrode bodies 32 on the first end wall 24 and the second electrode bodies 32 on the second end wall 26, which face against each other, fit to each other at the edges at the sight in the direction of the thickness of the container 12.

As shown in FIG. 9, the first electrode 18 includes multiple first electrode bodies 38 spaced apart in the direction of the extension of the virtual axis L on the second end wall 26.

According to the third embodiment, the first electrode bodies 38 are commonly connected by a common wiring section 3810 that extends along the virtual axis L.

Like the first embodiment, the first and second electrodes 18 and 20 contain a conductive material that allows light to pass through.

The first electrode bodies 38 of the first embodiment 18 are commonly connected to the ground terminal 2202 of the voltage application section 22 through the common wiring section 3810, and the second electrode bodies 32 of the second electrode 20 are connected to the voltage output terminal 2204 of the voltage application section 22 through the wiring section 3202.

The voltage application section 22 is configured to be capable of applying a voltage E selectively to each of the second electrode bodies 32 through the voltage output terminals 2204 and changing the position subject to the voltage application to the direction of the extension of the first and second electrodes 18 and 20.

Like the first embodiment, an insulating film, not shown, is provided on the internal surfaces of the first and second end walls 24 and 26 facing the holding chamber 30 and the second electrode bodies 32 on the internal surfaces.

No insulating film is provided on the first electrode bodies 38 on the internal surface of the second end wall 26.

Thus, voltage is applied between the first electrode 18 and the second electrode bodies 32 of the second electrode 20, whereby the surface of the insulating film may be positively charged, for example. Hence, an electric field is applied to the first liquid 14, and the electric field (electrostatic force) acts on the molecule of the first liquid 14. As a result, the first liquid 14 moves.

Like the first embodiment, a clear water-repellent film, not shown, that allows light to pass through covers the entire area of the insulating film on the internal surface of the first end wall 24.

A clear water-repellent film that allows light to pass through covers the entire area of the insulating film on the internal surface of the second end wall 26 and the entire area of the first electrode 18.

Also according to the third embodiment, changing the position subject to the voltage application by the voltage application section 22 in the direction of the extension of the first and second electrodes 18 and 20 moves, along the virtual axis L, the entire first liquid 14 in contact with both of the first and second end walls 24 and 26 and surrounded by the second liquid 16, like the first embodiment.

Therefore, the third embodiment also provides the same effects as those of the first embodiment.

In order to cause an electric field to act on the first liquid 14, when a larger part of the first liquid 14 is at one of the second electrode bodies 32, a part of the first liquid 14 in the direction of the virtual axis L may be required to face the adjacent electrode body 32. According to the first and second embodiments, since each of the second electrode bodies 32 has a rectangular form, the spaces between the second electrode bodies 32 in the direction of the virtual axis L may be required to be smaller than the diameter of the first liquid 14.

On the other hand, according to the third embodiment, since the pits and projections 3210 of the adjacent second electrode bodies 32 associate with each other, the spaces between the second electrode bodies 32 in the direction of the virtual axis L may be equal to or larger than the diameter of the first liquid 14. In this case, with a most part of the first liquid 14 at one of the second electrode bodies 32, a part of the first liquid 14 in the direction of the virtual axis L can be faced to the adjacent second electrode body 32, which is advantageous for increasing the spaces between the second electrode bodies 32.

Fourth Embodiment

A fourth embodiment will be described next.

The fourth embodiment is a variation example of the first embodiment and is different from the first embodiment in the form of the second electrode 20.

Figure 10:
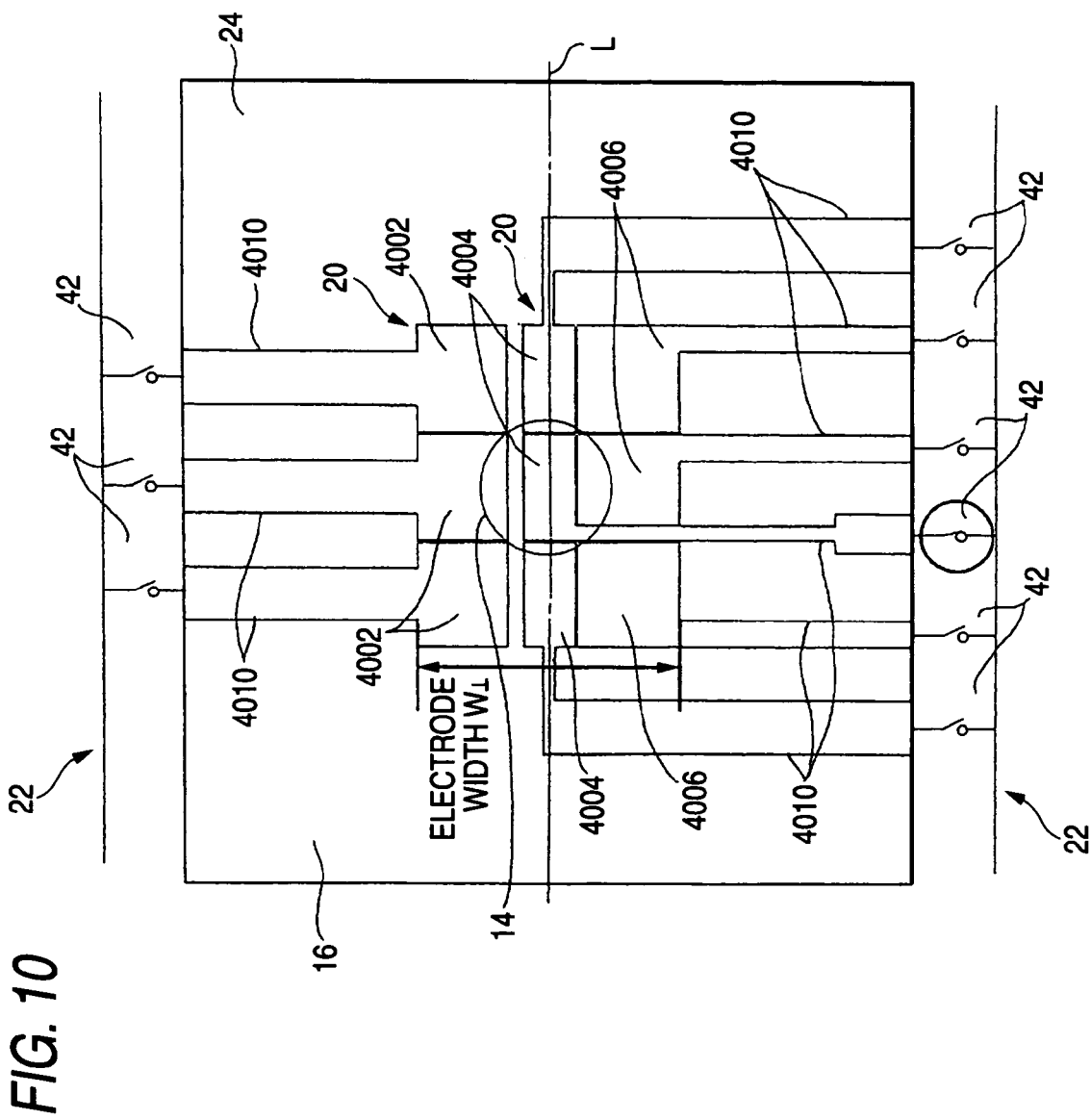
FIG. 10 is a plan view showing a form of the second electrode 20 on the internal surface of the first end wall 24 of the liquid moving apparatus 10 according to a fourth embodiment.
Figure 11:
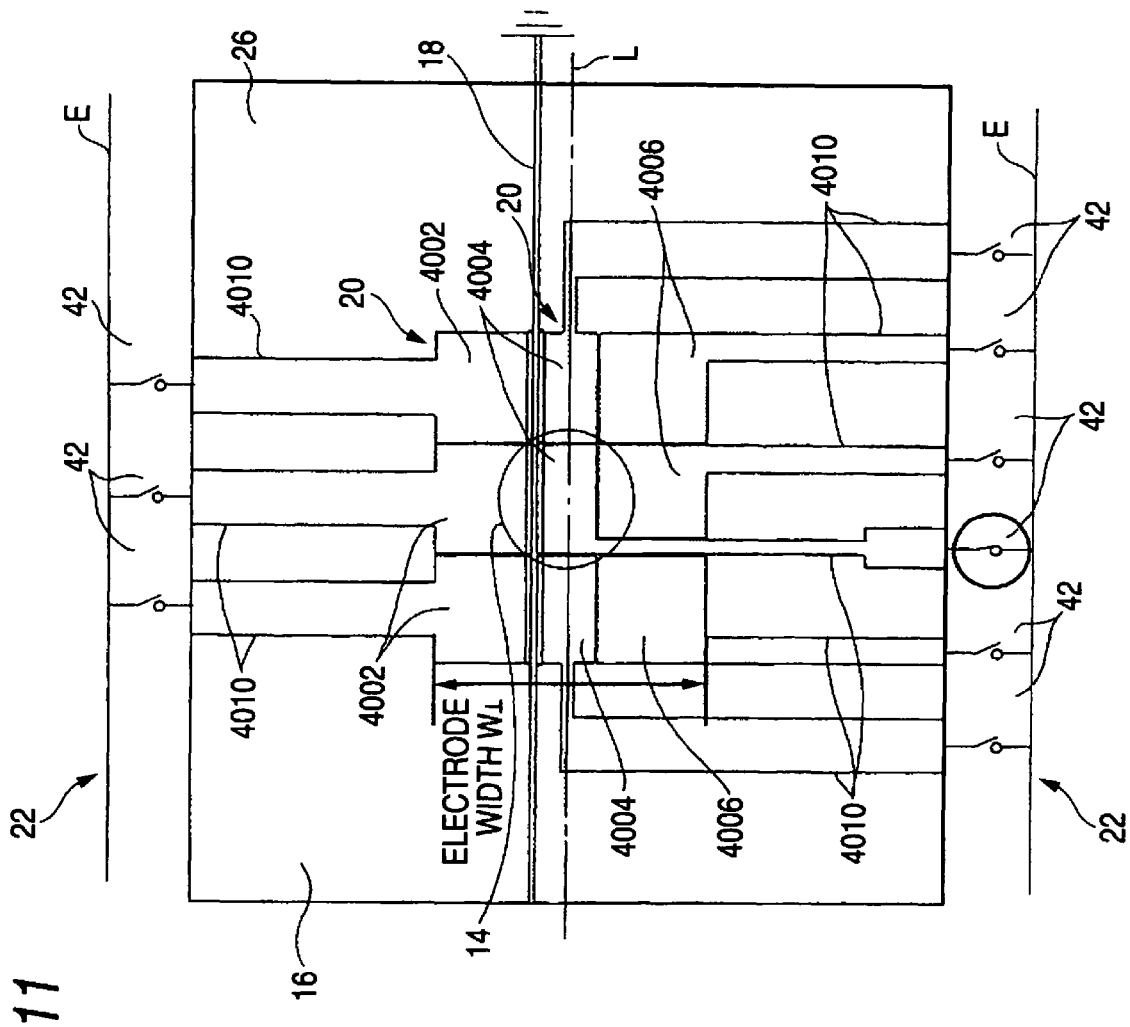
FIG. 11 is a plan view showing the forms of the first and second electrodes 18 and 20 on the internal surface of the second end wall 26.

FIG. 10 is a plan view showing a form of the second electrode 20 on the internal surface of the first end wall 24 of the liquid moving apparatus 10 according to the fourth embodiment. FIG. 11 is a plan view showing forms of the first and second electrodes 18 and 20 on the internal surface of the second end wall 26.

As shown in FIGS. 10 and 11, the second electrode 20 is provided on both of the internal surface of the first end wall 24 and the internal surface of the second end wall 26. The second electrode 20 includes multiple second electrode bodies 32 in the direction of the extension of the virtual axis L.

The second electrode bodies 32 have a same form in a same size and are equally spaced apart along the virtual axis L.

The dimension that the first liquid 14 occupies over the second electrode bodies 32 in the direction of the width orthogonal to the virtual axis L is called electrode width W⊥, below.

The second electrode bodies 32 include multiple electrode bodies having at least three sections in the direction of the width orthogonal to the direction of the extension of the virtual axis L. According to the fourth embodiment, each of the second electrode bodies 32 includes three electrode body sections 4002, 4004 and 4006.

As shown in FIGS. 10 and 11, among the multiple electrode body sections 4002, 4004 and 4006, the electrode body sections 4002 and 4006 on both sides of the first end wall 24 in the direction of the width orthogonal to the virtual axis L and the electrode body sections 4002 and 4006 on both sides of the second end wall 26 in the direction of the width orthogonal to the virtual axis L are placed at a position allowing the contact with the both sides of the first liquid 14.

The second electrode bodies 32 on the first end wall 24 and the second electrode bodies 32 on the second end wall 26, which face against each other, are positioned to fit each other at the edges at the sight in the direction of the thickness of the container 12.

The electrode body sections 4002, 4004 and 4006 on the first end wall 24 and the electrode body sections 4002, 4004 and 4006 on the second end wall 26, which face against each other, are positioned to fit each other at the edges at the sight in the direction of the thickness of the container 12.

As shown in FIG. 11, the first electrode 18 extends linearly (straight) along the virtual axis L on the second end wall 26 (on the internal surface where the second end wall 26 faces the holding chamber 30).

On the second end wall 26, as shown in FIG. 11, one electrode body section 4002 and two electrode body sections 4004 and 4006 are spaced apart at one and the other positions in the direction of the width through the first electrode 18.

In FIGS. 10 and 11, the reference numeral 4010 indicates wiring sections extending from the electrode body sections 4002, 4004 and 4006.

The first electrode 18 is connected to the ground terminal 2202 of the voltage application section 22, and the electrode body sections 4002, 4004 and 4006 of the second electrode body 32 are connected to the voltage application section 22 through the wiring sections 4010.

According to this embodiment, the voltage application section 22 is configured to be capable of applying a voltage E selectively to each of the electrode body sections 4002, 4004 and 4006 through switches 42, each of which is provided for each of the wiring sections 4010, and changing the position subject to the voltage application to the direction of the extension of the first and second electrodes 18 and 20 by selectively turning on and off the switches 42.

The first and second electrodes 18 and 20 contain a conductive material that allows light to pass through, like the first embodiment.

Like the first embodiment, an insulating film, not shown, is provided on the internal surfaces of the first and second end walls 24 and 26 facing the holding chamber 30 and the second electrode bodies 32 on the internal surfaces.

No insulating film is provided on the first electrode bodies 38 on the internal surface of the second end wall 26.

Thus, voltage is applied between the first electrode 18 and the second electrode bodies 32 of the second electrode 20, whereby the surface of the insulating film may be positively charged, for example. Hence, an electric field is applied to the first liquid 14, and the electric field (electrostatic force) acts on the molecule of the first liquid 14. As a result, the first liquid 14 moves.

Like the first embodiment, a clear water-repellent film, not shown, that allows light to pass through covers the entire area of the insulating film on the internal surface of the first end wall 24.

A clear water-repellent film that allows light to pass through covers the entire area of the insulating film on the internal surface of the second end wall 26 and the entire area of the first electrode 18.

Next, an operation of the liquid moving apparatus 10 will be described.

Figure 12:
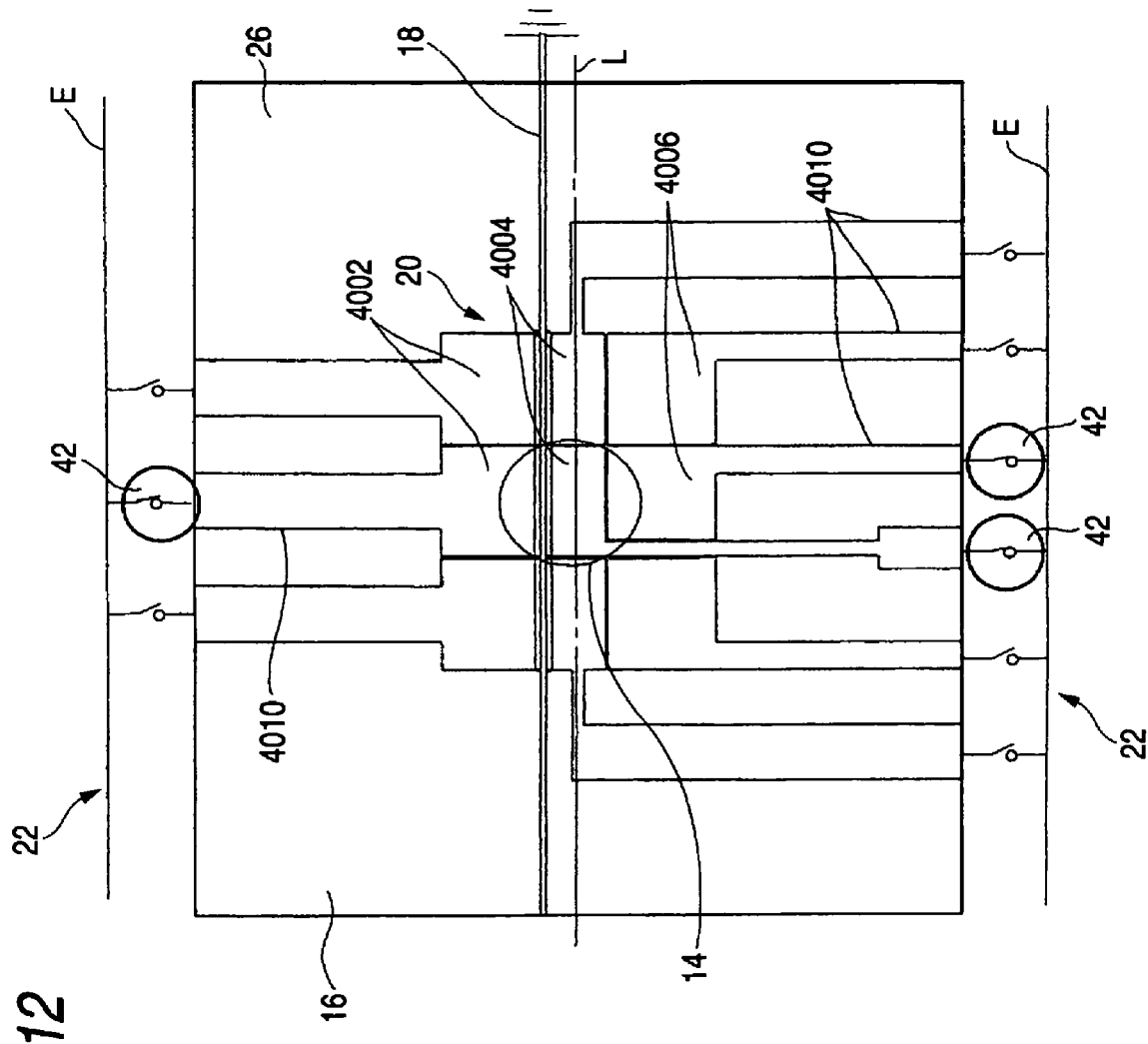
FIG. 12 is an explanatory diagram describing an operation of the liquid moving apparatus 10.
Figure 13:
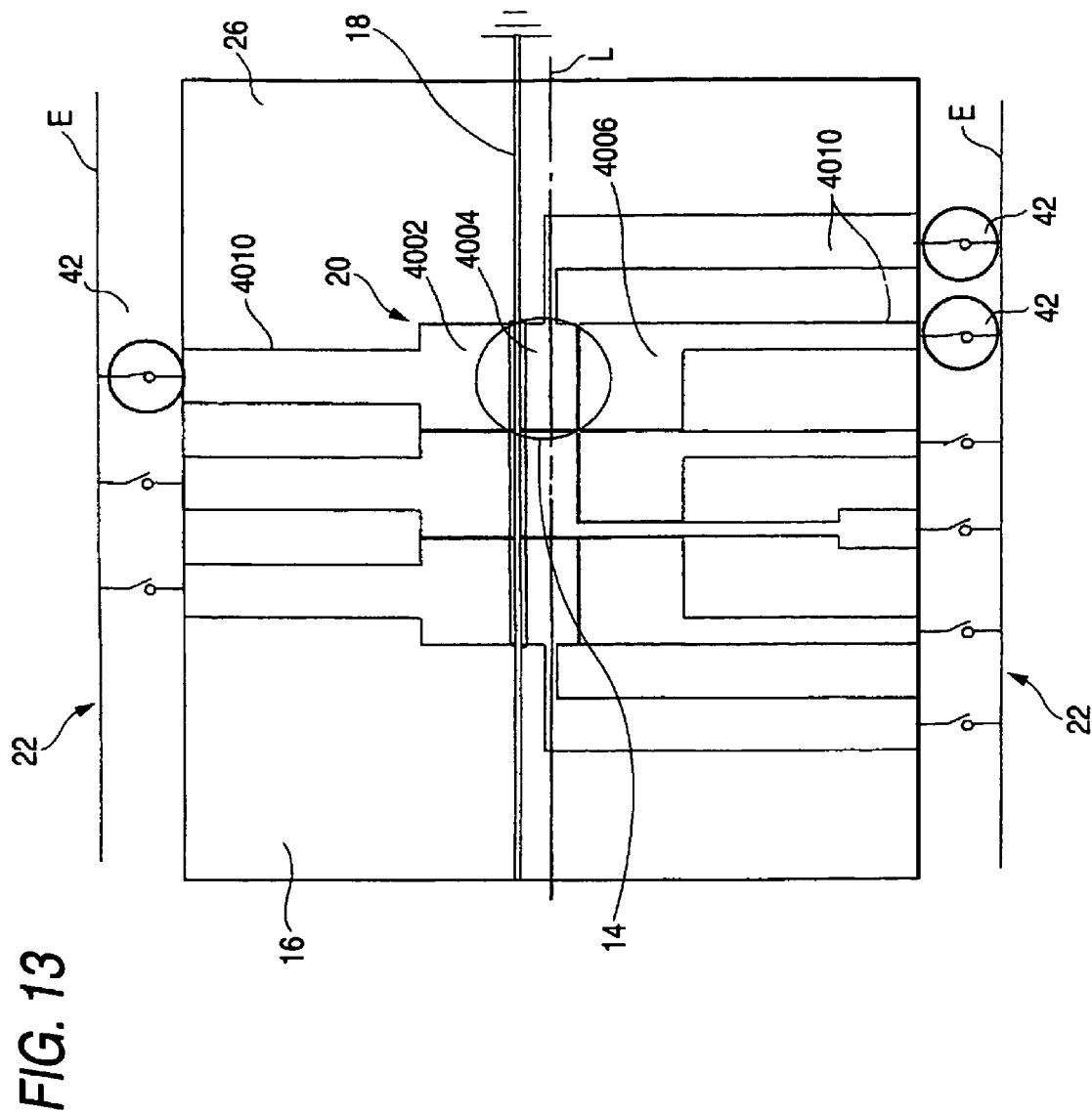
FIG. 13 is an explanatory diagram describing an operation of the liquid moving apparatus 10.
Figure 14:
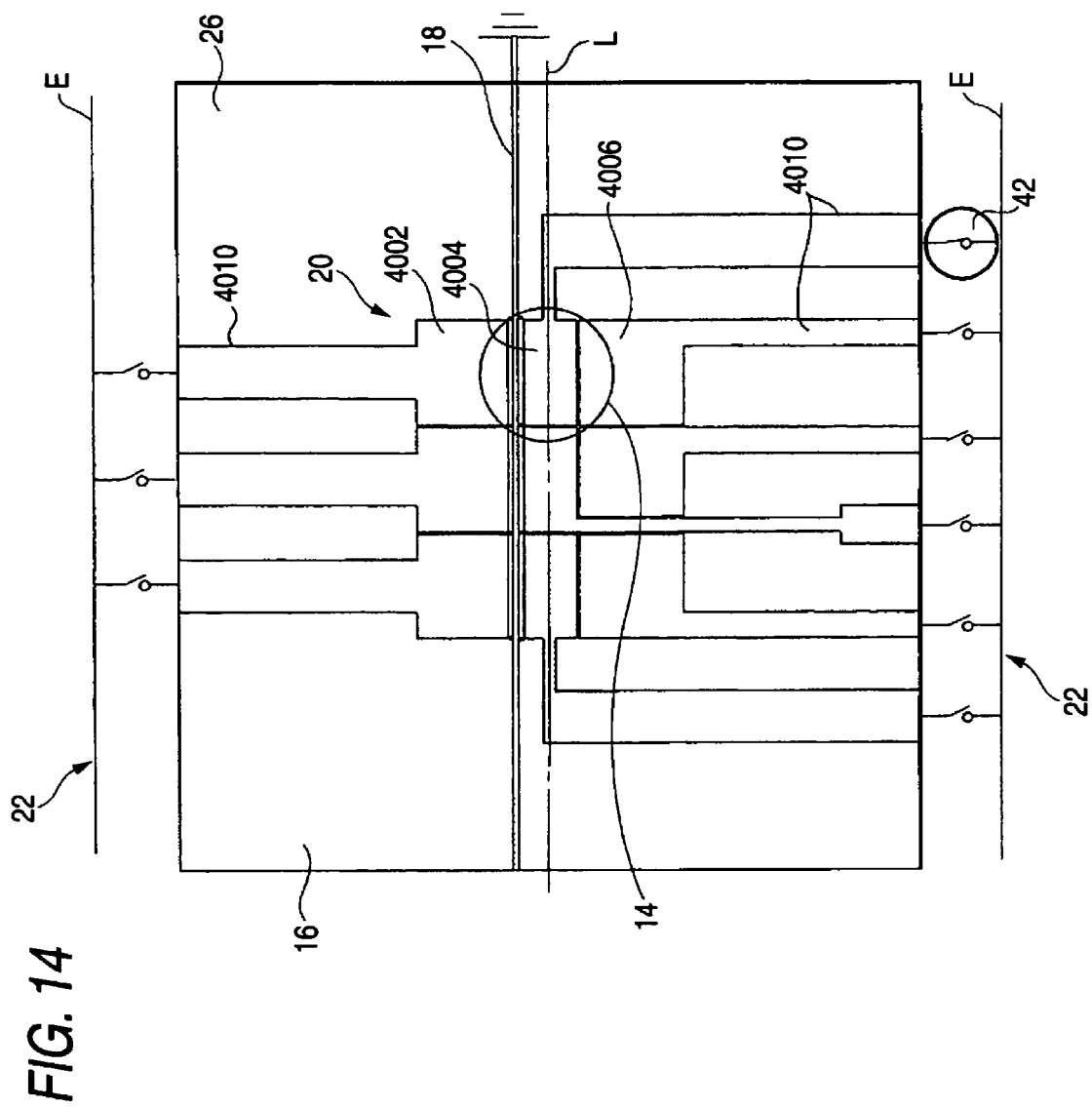
FIG. 14 is an explanatory diagram describing an operation of the liquid moving apparatus 10.

FIGS. 12, 13 and 14 are explanatory diagrams describing an operation of the liquid moving apparatus 10.

For convenience of description, the switch 42 at the ON state among the switches 42 is circled.

The operation for applying the voltage E to the electrode body sections 4002, 4004 and 4006 on the second end wall 26 will be described below though the description of the operation for applying the voltage E to the electrode body sections 4002, 4004 and 4006 on the first end wall 24 will be omitted since they are the same.

Initially, as shown in FIG. 11, the first liquid 14 is positioned on the center second electrode 20 among three second electrodes 20 in the direction of the extension of the virtual axis L.

In this case, the switch 42 corresponding to the center electrode body section 4004 is only ON in the second electrode 20 where the first liquid 14 positions, and the voltage E is applied to the electrode body section 4004. Thus, an electric field generated between the electrode body section 4004 and the first electrode 18 acts on the first liquid 14. Therefore, the first liquid 14 has a round form and is held at a position on the center second electrode 20.

Next, as shown in FIG. 12, in addition to the switch 42 corresponding to the electrode body section 4004, the two switches 42 corresponding to the electrode body sections 4002 and 4006 on both sides of the electrode body section 4004 are turned on.

Thus, the voltage E is applied to all of the three electrode bodies 4002, 4004 and 4006. Hence, the electric field generated between the electrode body section 4004 and the first electrode 18 and the electric field generated between the electrode body sections 4002 and 4006 and the first electrode 18 act on the first liquid 14. Therefore, a force is applied to the first liquid 14 in the direction orthogonal to the virtual axis L. As a result the form of the first liquid 14 is changed from the round form to an oval form extending in the direction orthogonal to the virtual axis L.

Next, as shown in FIG. 13, when all of the switches 42 corresponding to the three electrode body sections 4002, 4004 and 4006 of the center second electrode 20, all of the switches 42 corresponding to the three electrode body sections 4002, 4004 and 4006 of the adjacent second electrode 20 are turned on.

Then, the voltage E is applied to all of the three electrode body sections 4002, 4004 and 4006 of the adjacent second electrode 20, whereby the electric field generated between the three electrode body sections 4002, 4004 and 4006 and the first electrode 18 acts thereon. Thus, a force is applied to the first liquid 14 in the direction orthogonal to the virtual axis L. Therefore, the first liquid 14 in the oval form extending in the direction orthogonal to the virtual axis L moves from the center second electrode 20 to the adjacent second electrode 20.

Next, as shown in FIG. 14, among the switches 42 corresponding to the three electrode bodies 4002, 4004 and 4006 of the adjacent second electrode 20, only the switch 42 corresponding to the electrode body section 4004 is turned on, and the switches 42 corresponding to the remaining two electrode body sections 4002 and 4006 are turned off.

Thus, the voltage E is applied to the electrode body section 4004, whereby the electric field generated between the electrode body section 4004 and the first electrode 18 only acts on the first liquid 14. Therefore, the form of the first liquid 14 is changed from the oval form to a round form, and the first liquid 14 is held at a position on the adjacent second electrode 20.

In addition to that the fourth embodiment provides the same effects as those of the first embodiment apparently, the electrode width $W\perp$ where the first liquid 14 occupies the second electrode 32 in the direction of the width orthogonal to the virtual axis L increases since the form of the first liquid 14 is changed from a round form to an oval form extending in the direction orthogonal to the virtual axis L by the application of the voltage E to all of the three electrode body sections 4002, 4004 and 4006 of the second electrode 20 when the first liquid 14 moves from one second electrode 20 to the adjacent second electrode 20.

Here, since the force Fw to be applied to the first liquid 14 is proportional to the electrode width $W\perp$ as expressed by Equation (1), the force acting on the first liquid 14 increases. Thus, the increase in force acting on the first liquid 14 is advantageous for increasing the moving speed of the first liquid 14.

Fifth Embodiment

Next, a fifth embodiment will be described.

The fifth embodiment is a variation example of the first embodiment. The fifth embodiment is different from the first embodiment in that, according to a first embodiment, the transmittance of the first liquid 14 is lower than the transmittance of the second liquid 16 while, according to the fifth embodiment, the transmittance of the second liquid 16 is lower than the transmittance of the first liquid 14. The rest is the same as the first embodiment.

Figure 15:
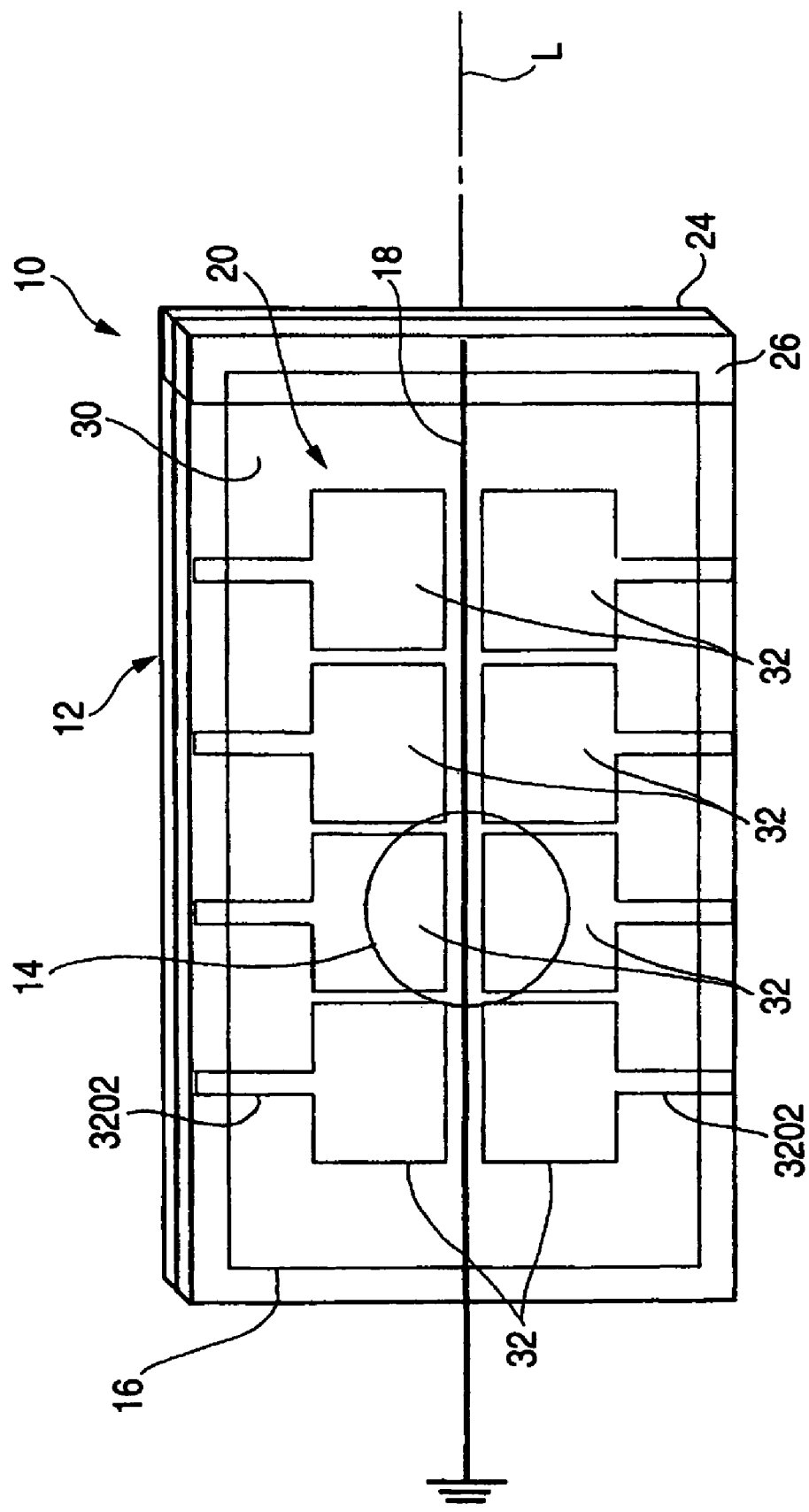
FIG. 15 is an explanatory diagram showing a construction of the liquid moving apparatus 10 according to a fifth embodiment.

FIG. 15 is an explanatory diagram showing a construction of the liquid moving apparatus 10 according to the fifth embodiment.

As shown in FIG. 15, the first liquid 14 is clear and polarized or conductive and is filled in the holding chamber 30.

The second liquid 16 does not mix with the first liquid 14 and is filled in the holding chamber 30.

The first liquid 14 and the second liquid 16 have a substantially equal specific gravity, and the transmittance of the second liquid 16 is lower than the transmittance of the first liquid 14.

According to this embodiment, the second liquid 16 may contain a clear silicon oil, and the transmittance of the second liquid 16 is lower than the transmittance of the first liquid 14 by distributing a coloring agent having a lipophilically-processed surface to the second liquid 16.

The time T for moving the first liquid 14 by a distance L [m] is expressed by:

$$T=(1/V)(2LMt/\in 0 \in rW\perp)^{1/2}[\sec] \quad (3)$$

based on Equation (1).

For example, when the movement distance L=1 [mm], the mass M of the first liquid 14 is 0.5 [mg], the thickness of the insulating film is 1 [μm], the specific dielectric constant $\in r$ of the insulating film is 3, and the diameter of the first liquid 14 is 1 [mm] where the diameter of the first liquid 14 is the electrode width $W\perp$, which is the dimension that the first liquid 14 occupies the second electrode 32 in the direction of the width orthogonal to the virtual axis L, T=194/V [msec] based on Equation (3).

For example, when the applied voltage is 100 [V], the first liquid 14 moves at about 1.9 [msec].

The use of an insulating film with a high dielectric constant can decrease the voltage.

In reality, because the viscous drag from the second liquid 16 and the friction between the first liquid 14 and the water-repellent film in contact with the first liquid 14 have an effect on the movement of the first liquid 14, the speed may be lower than 1.9 [ms]. However, the use of a water-repellent film with a high water-repellency and the second liquid 16 with a low viscosity, such as a silicon oil with a low viscosity, can alleviate the effect.

The fifth embodiment can also provide the same effects as those of the first embodiment.

The liquid moving apparatus 10 of the fifth embodiment may be also applicable as a shutter of the imaging apparatus 100 shown in FIG. 5, like the first embodiment.

The liquid moving apparatus 10 of the fifth embodiment is placed between the filter group 114 and the imaging element 102, and the first liquid 14 is moved with the virtual axis L in parallel with the plane orthogonal to the optical axis G of the shooting optical system 104. Thus, the first liquid 14 on the optical axis G can conduct the light flux to the imaging element 102. Because of the first liquid 14 off the optical axis G, the second liquid 16 can interrupt the light flux conducted to the imaging element 102.

Therefore, also in the liquid moving apparatus 10 according to the fifth embodiment, when the light flux is interrupted by the movement of the first liquid 14, the time for the irradiation to the imaging plane 102A, that is, the exposure time of the imaging element 102 can be controlled.

The aperture time can be controlled by moving the first liquid 14 in the direction of the extension of the virtual axis L and back.

Sixth Embodiment

A sixth embodiment will be described next.

The sixth embodiment is a variation example of the first embodiment, and the use of multiple first liquids 14 having different transmittances implements the function of an ND filter (Neutral Density Filter).

Figure 16:
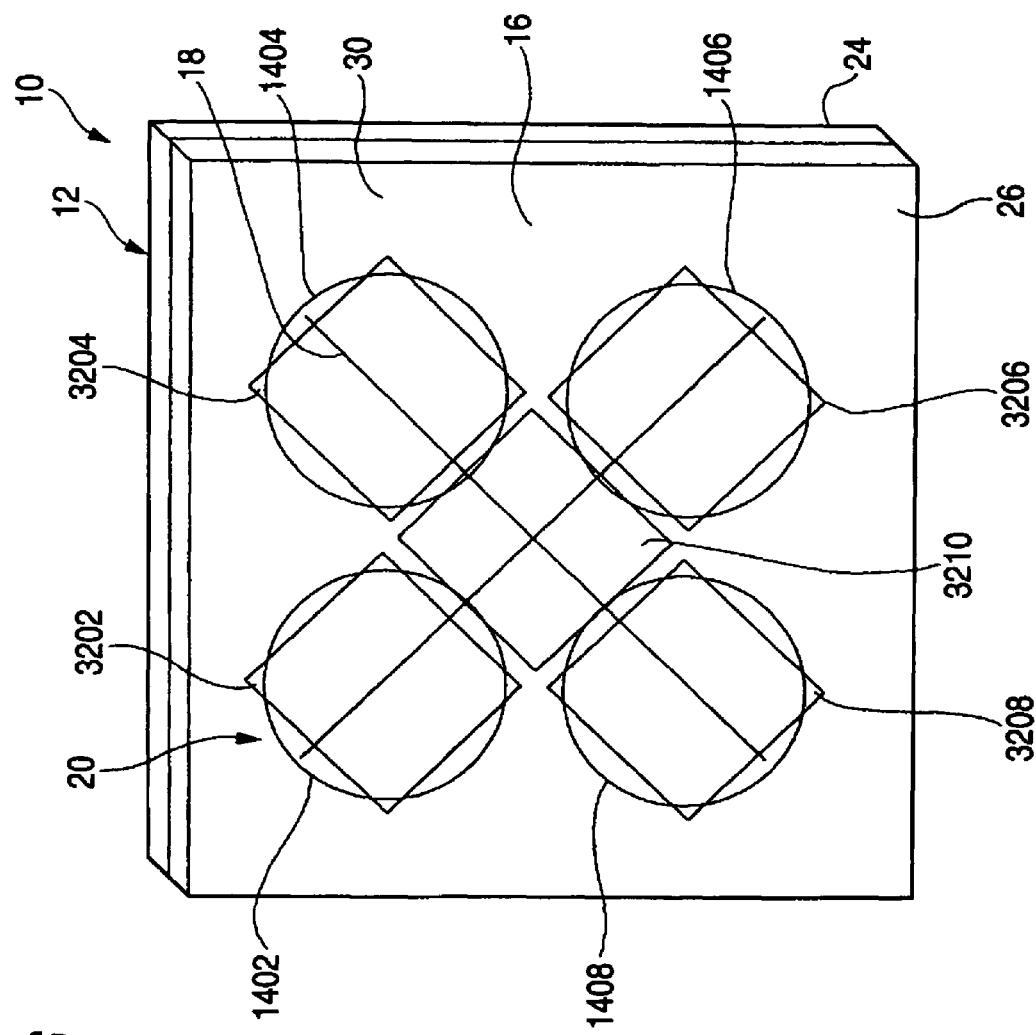
FIG. 16 is an explanatory diagram of the liquid moving apparatus 10 according to a sixth embodiment.

FIG. 16 is an explanatory diagram of the liquid moving apparatus 10 of the sixth embodiment.

As shown in FIG. 16, four kinds of first liquid 1402, 1404, 1406 and 1408 are polarized or conductive and are filled in the holding chamber 30.

The second liquid 16 is clear, does not mix with the four kinds of first liquid 1402, 1404, 1406 and 1408 and is filled in the holding chamber 30.

The four kinds of first liquid 1402, 1404, 1406 and 1408 and the second liquid 16 have a substantially equal specific gravity.

When the transmittances of the four kinds of first liquid 1402, 1404, 1406 and 1408 are T1, T2, T3 and T4, the transmittances T1, T2, T3, T4 are lower than the transmittance of the second liquid 16 and are formed to T1<T2<T3<T4.

The second electrode 20 includes five second electrode bodies 3202, 3204, 3206, 3208 and 3210 in a same form and in a same size on the first and second end walls 24 and 26.

The second electrode bodies 3202, 3204, 3206, 3208 and 3210 on the first end wall 24 and the second electrode bodies 3202, 3204, 3206, 3208 and 3210 on the second end wall 26, which face against each other, are positioned to fit at the edges at the sight in the direction of the thickness of the container 12.

According to this embodiment, four second electrode bodies 3202, 3204, 3206 and 3208 are placed adjacent to the four sides of the one second electrode body 3210. The first electrode 18 linearly extends on the second end wall 26 so as to divide the center second electrode body 3210 into four and each of the remaining second electrode bodies 3202, 3204, 3206 and 3208 into two.

The first liquids 1402, 1404, 1406 and 1408 are placed over the second electrode bodies 3202, 3204, 3206 and 3208.

The application of the voltage E selectively to the second electrode bodies 3202, 3204, 3206, 3208 and 3210 by a voltage application section, not shown, moves the first liquid 1402, 1404, 1406 and 1408 selectively on the second electrode body 3201.

The sixth embodiment apparently provides the same effects as those of the first embodiment. Furthermore, according to the sixth embodiment, the positioning of the center second electrode body 3210 on the optical path of a shooting optical system of an imaging apparatus can implement the function as an ND filter by entering and extracting the multiple first liquids 1402, 1404, 1406 and 1408 having different transmittances to/from the optical path.

Seventh Embodiment

A seventh embodiment will be described next.

The seventh embodiment is a variation example of the first embodiment and is different from the first embodiment only in that the second electrode 20 is divided into ones in a smaller size than that of the diameter of the first liquid 14.

Figure 17:
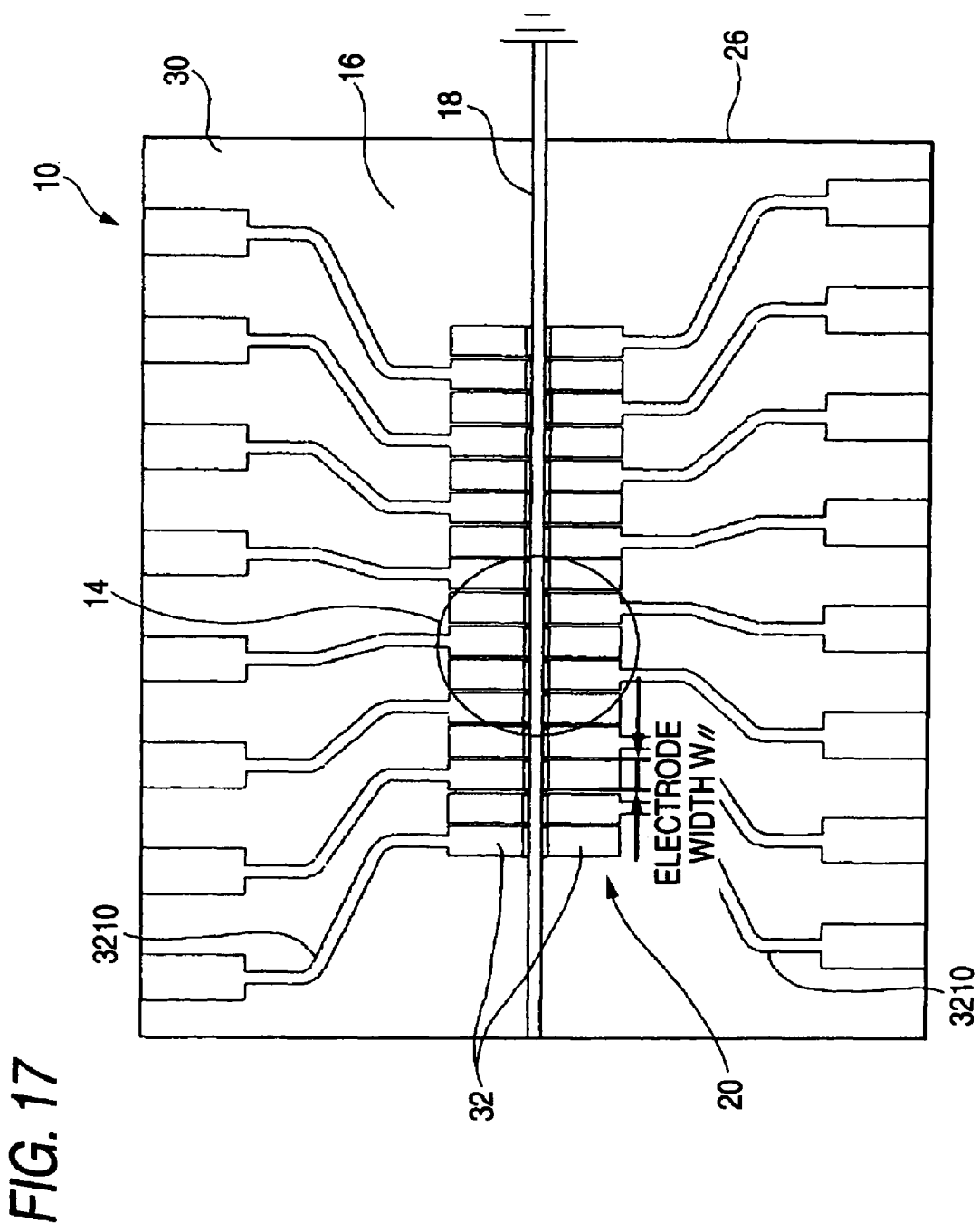
FIG. 17 is a plan view showing the forms of the first and second electrodes 18 and 20 on the internal surface of the second end wall 26 according to a seventh embodiment.

FIG. 17 is a plan view showing forms of the first and second electrodes 18 and 20 on the internal surface of the second end wall 26 according to the seventh embodiment.

As shown in FIG. 17, the electrode width w" is smaller than the diameter of the first liquid 14 and is equal to or smaller than ¼ of the diameter of the first liquid 14 in this embodiment where the electrode width w" is the dimension of each of the multiple second electrode bodies 32 of the second electrode 20 in the direction of the extension of the virtual axis L.

Thus, according to the seventh embodiment, the first liquid 14 can be advantageously moved in smaller steps than that of the first embodiment, apparently providing the same effects as those of the first embodiment.

By moving the first liquid 14 in smaller steps, the liquid moving apparatus 10 can be functioned as an iris, as described next.

Figure 18A:
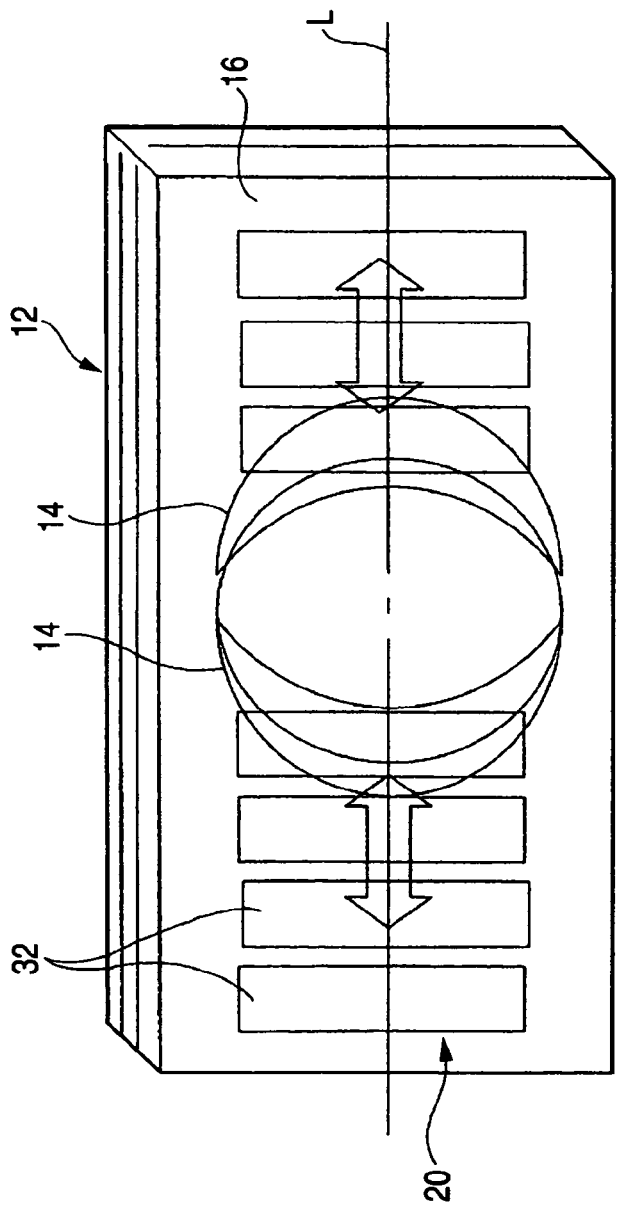
FIG. 18A is a diagram showing the principle in a case where the liquid moving apparatus 10 functions as an iris according to the seventh embodiment.
Figure 18B:
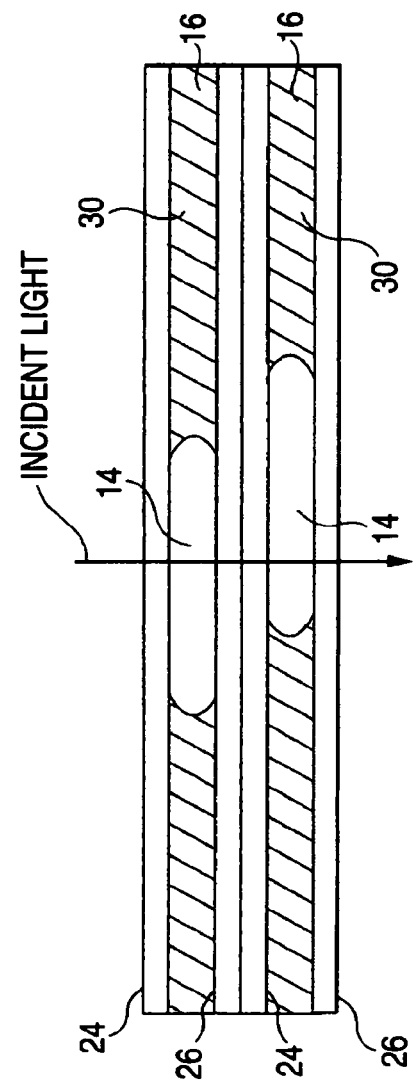
FIG. 18B is a section diagram of FIG. 18A.

FIG. 18A is a diagram showing the principle where the liquid moving apparatus 10 is functioned as an iris according to the seventh embodiment, and FIG. 18B is a section diagram of FIG. 18A.

As shown in FIGS. 18A and 18B, two liquid moving apparatus 10 are fixed one over another in the thickness of the container 12 such that the virtual axis L thereof can be parallel.

Like the fifth embodiment, the first liquid 14 and the second liquid 16 have a substantially equal specific gravity, and the transmittance of the second liquid 16 is lower than the transmittance of the first liquid 14.

Because of this construction, the application of a voltage E to the second electrode bodies 32 of the two liquid moving apparatus 10 and movement of the first liquid 14 in smaller steps in the direction of the extension of the virtual axes L can increase/decrease the size of the area where the first liquids 14 overlap as shown in FIG. 18B. Thus, the amount of incident light can be adjusted in smaller steps. Therefore, the liquid moving apparatus 10 can be functioned as an iris that increases/decreases the amount of light in a stepwise manner.

It should be understood by those skilled in the art that various modifications, combinations, sub-combinations and alterations may occur depending on design requirements and other factors insofar as they are within the scope of the appended claims or the equivalents thereof.

The invention claimed is:

1. A liquid moving apparatus comprising:
a container having a holding chamber enclosed by first and second end walls facing against each other and side walls connecting the first and second end walls;
a polarized or conductive first liquid filled in the holding chamber;
a second liquid filled in the holding chamber and prevented from mixing with the first liquid;
first and second electrodes for applying an electric field to the first liquid; and
voltage application means for applying voltage between the first electrode and the second electrode,
wherein the first and second electrodes are placed along a virtual axis extending in the direction where the first and second end walls face against each other, which is the direction orthogonal to the direction of the thickness of the container;
the change of the position subject to the voltage application by the voltage application means to the direction of the extension of the first and second electrodes brings the first liquid contact with both of the first and second end walls and moves the entire first liquid surrounded by the second liquid along the virtual axis; and
the second electrode is provided on the internal surface of the first end wall and the internal surface of the second end wall, which face the holding chamber, and includes multiple second electrode bodies in the direction of the extension of the virtual axis.

2. The liquid moving apparatus according to claim 1, wherein the multiple second electrode bodies on the interface surface of the first end wall and the internal surface of the second end wall have forms with the edges fitting each other at the sight in the direction of the thickness of the container.

3. The liquid moving apparatus according to claim 1, wherein the first electrode extends linearly along the virtual axis.

4. The liquid moving apparatus according to claim 1, wherein the first electrode is provided on the second end wall and extends linearly along the virtual axis.

5. The liquid moving apparatus according to claim 1, wherein the first electrode is provided on the second end wall and includes multiple first electrode bodies spaced apart in the direction of the extension of the virtual axis.

6. The liquid moving apparatus according to claim 1, wherein the first electrode extends along the virtual axis within the holding chamber.

7. The liquid moving apparatus according to claim 6, wherein the first electrode is placed at a position close to one side of the first end wall in the direction of the width orthogonal to the virtual axis of the container within the holding chamber.

8. The liquid moving apparatus according to claim 1, wherein pits and projections extend at the position where the second electrode bodies are adjacent to each other and in the direction orthogonal to the direction of the extension of the virtual axis; and the adjacent second electrode bodies are provided with the pits and projections associating with each other.

9. The liquid moving apparatus according to claim 1, wherein the second electrode bodies include multiple electrode bodies having at least three sections in the direction orthogonal to the direction of the extension of the virtual axis; and the electrode bodies at the both sides among the electrode bodies are placed at a position allowing the contact with the both sides of the first liquid.

* * * * *